(12) United States Patent
Kondo et al.

(10) Patent No.: US 7,894,096 B2
(45) Date of Patent: Feb. 22, 2011

(54) IMAGE-FORMING METHOD

(75) Inventors: Masaki Kondo, Toyoake (JP); Masashi Ueda, Nagoya (JP); Yasunari Yoshida, Ama-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1386 days.

(21) Appl. No.: 11/094,426

(22) Filed: Mar. 31, 2005

(65) Prior Publication Data
US 2005/0219650 A1    Oct. 6, 2005

(30) Foreign Application Priority Data
Mar. 31, 2004  (JP) ............................. 2004-106024

(51) Int. Cl.
  G06K 15/02 (2006.01)
  H04N 1/04 (2006.01)
(52) U.S. Cl. ........................ 358/1.2; 358/486
(58) Field of Classification Search ........... 358/486, 358/1.2; 400/124.01, 121, 304; 347/57, 347/10, 56, 65, 66, 41; 346/140
See application file for complete search history.

(56) References Cited

U.S. PATENT DOCUMENTS

| | | | |
|---|---|---|---|
| 4,967,203 A | 10/1990 | Doan et al. | |
| 5,583,550 A | 12/1996 | Hickman et al. | |
| 5,774,146 A | 6/1998 | Mizutani | |
| 5,835,624 A | 11/1998 | Ueda et al. | |
| 5,889,537 A | 3/1999 | Shimada | |
| 5,995,715 A | 11/1999 | Berche et al. | |
| 6,164,745 A * | 12/2000 | Nagoshi et al. | 347/15 |
| 6,517,267 B1 * | 2/2003 | Otsuki | 400/124.01 |
| 6,561,610 B2 | 5/2003 | Yamasaki et al. | |
| 6,666,539 B2 | 12/2003 | Sato | |
| 6,726,299 B2 | 4/2004 | Takahashi et al. | |
| 7,130,083 B1 | 10/2006 | Konno et al. | |
| 2004/0056909 A1 | 3/2004 | Takahashi et al. | |

FOREIGN PATENT DOCUMENTS

| | | |
|---|---|---|
| JP | A 9-69960 | 3/1997 |
| JP | A 9-116776 | 5/1997 |

(Continued)

*Primary Examiner*—Benny Q Tieu
*Assistant Examiner*—Ngon Nguyen
(74) *Attorney, Agent, or Firm*—Oliff & Berridge, PLC

(57) ABSTRACT

In an image-forming method, a device reads line data L for one line and determines whether the resolution of the line data L in the main scanning direction is greater than or equal to a threshold th. If the resolution is greater than or equal to the threshold th, then a multiple line process is performed on the line data L to divide this data into two sets of partial line data L1 and L2. The partial line data L1 and L2 are used to form two lines at locations shifted from each other in the sub-scanning direction. However, if the resolution of the line data L is smaller than the threshold th, then a single line process is performed to divide the line data L into two segments Q1 and Q2. The segments Q1 and Q2 of the line data L are used to form a single line at the same location in the sub-scanning direction by printing the segment Q1 in the first main scanning operation and by printing the segment Q2 in the second main scanning operation.

33 Claims, 24 Drawing Sheets

FOREIGN PATENT DOCUMENTS

| | | |
|---|---|---|
| JP | A 10-67126 | 3/1998 |
| JP | A 10-157137 | 6/1998 |
| JP | A-11-48467 | 2/1999 |
| JP | B2 2931822 | 5/1999 |
| JP | B2 2994015 | 10/1999 |
| JP | A 2000-15867 | 1/2000 |
| JP | B2 3133946 | 11/2000 |
| JP | B2 3157881 | 2/2001 |
| JP | A-2001-105633 | 4/2001 |
| JP | A 2001-277493 | 10/2001 |
| JP | B2 3353828 | 9/2002 |
| JP | A 2002-292878 | 10/2002 |
| JP | A 2003-53943 | 2/2003 |

* cited by examiner

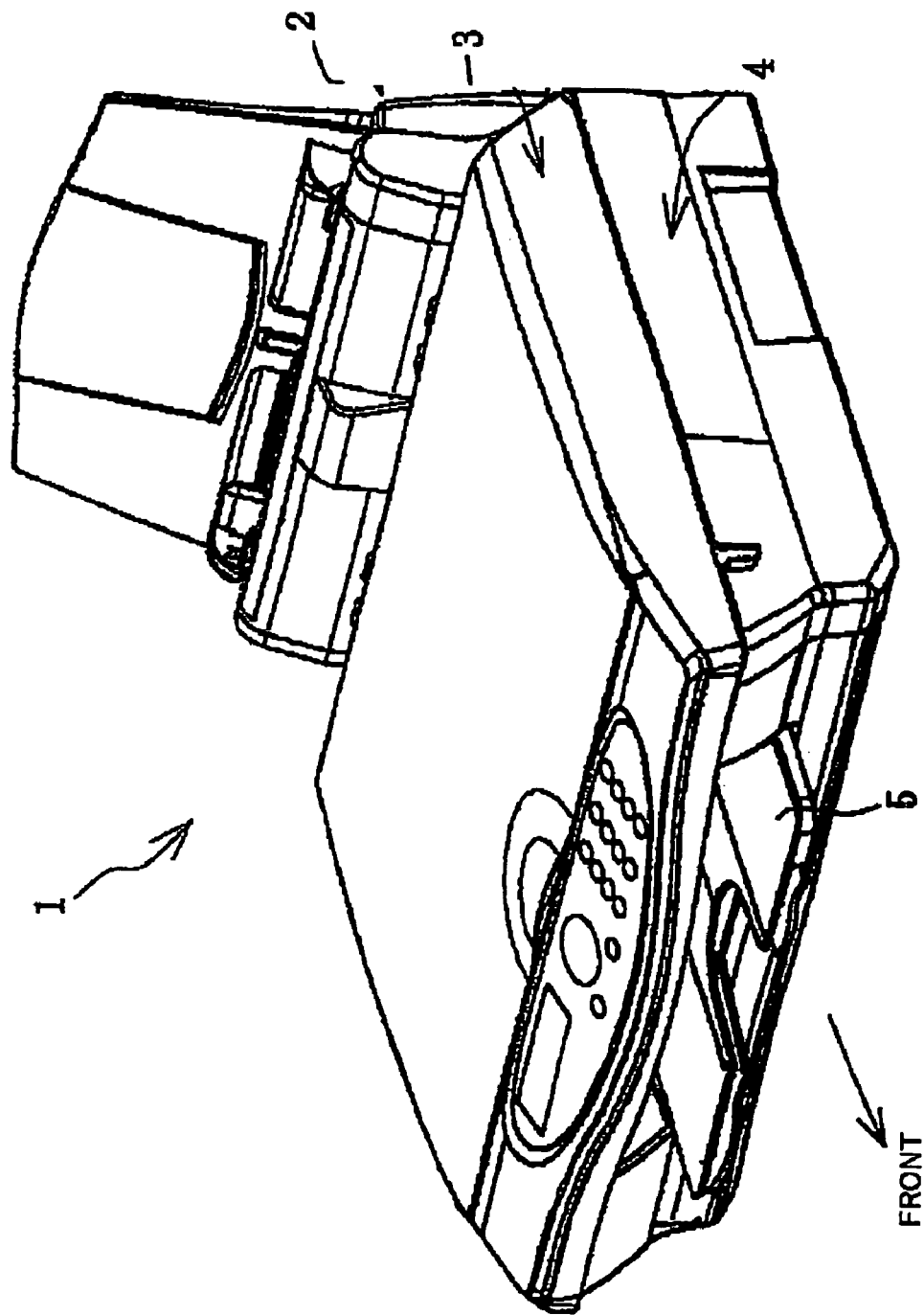

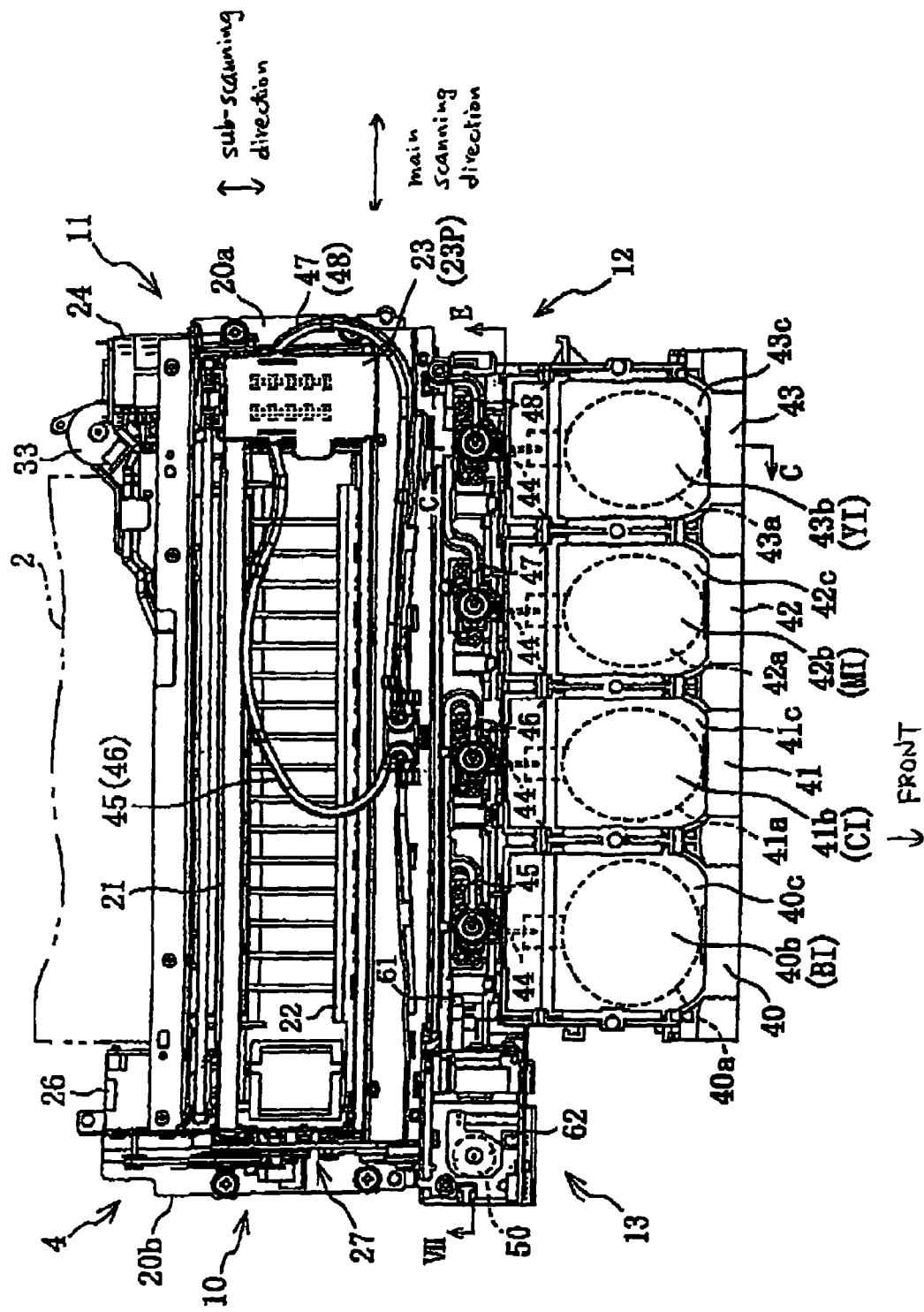

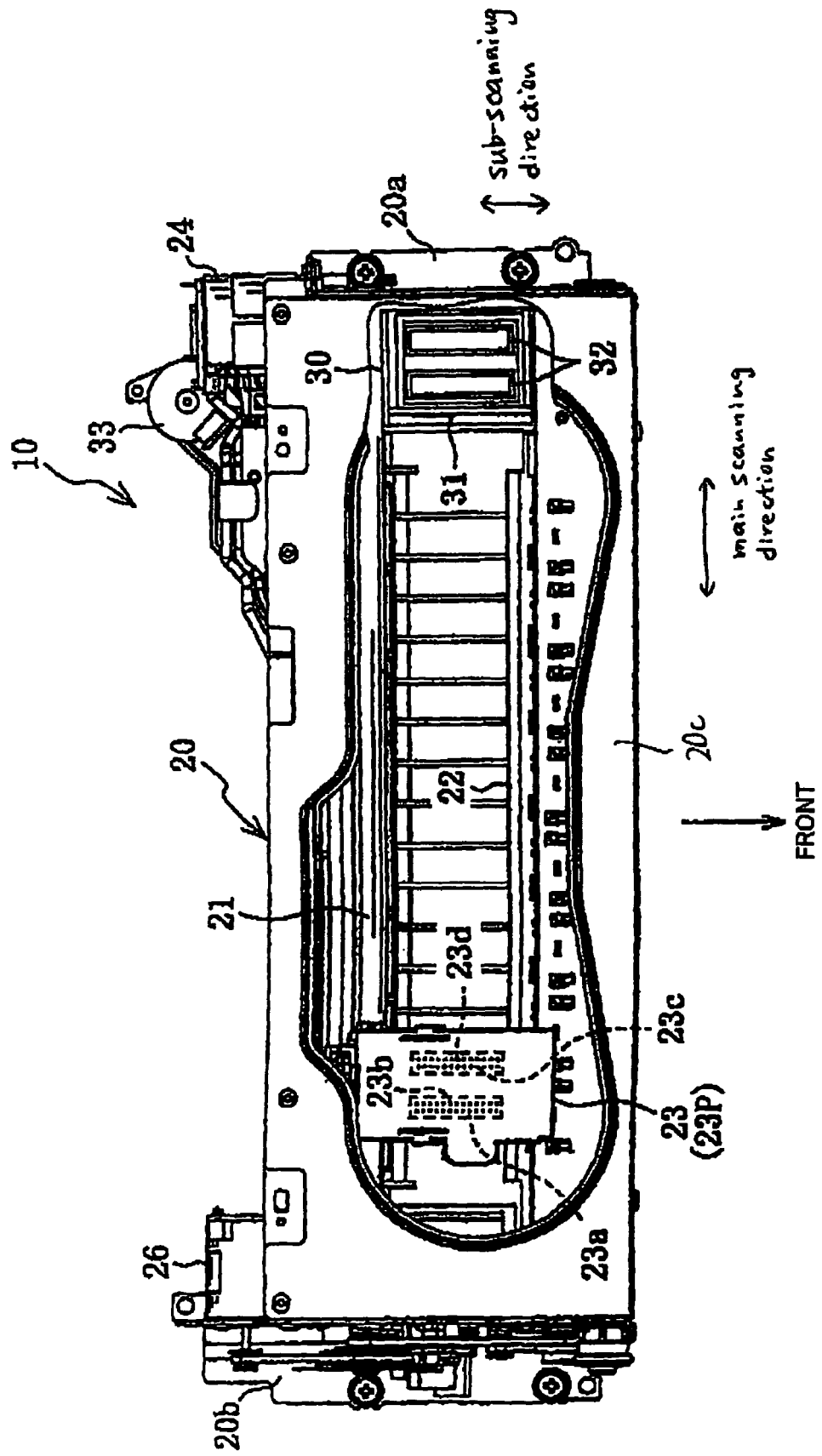

$$M = \left\{ \begin{array}{c} M_1 \\ M_2 \end{array} \right\} = \left\{ \begin{array}{c} 1, 0 \\ 0, 1 \end{array} \right\}$$

GAPS

SHIFTED DOWNWARD

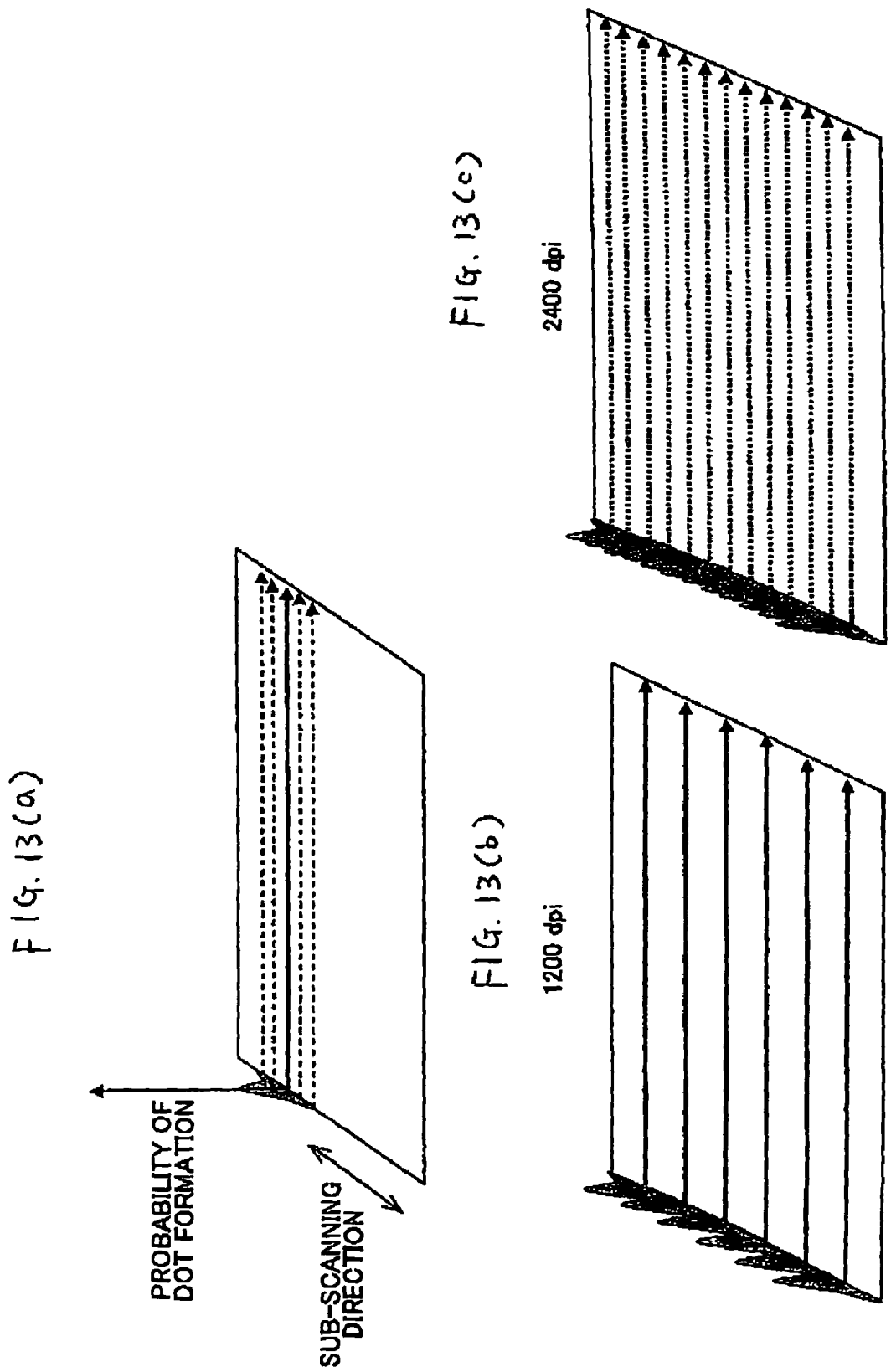

GAPS

| RECORDING DENSITY (dpi) | DOT DIAMETER d ($\mu$m) | d/2 ($\mu$m) |
|---|---|---|
| 300 | 84.7 | 42.3 |
| 600 | 42.3 | 21.2 |
| 1200 | 21.2 | 10.6 |
| 2400 | 10.6 | 5.3 |
| 3600 | 7.1 | 3.5 |
| 4800 | 5.3 | 2.6 |
| 6000 | 4.2 | 2.1 |

$$M = \begin{Bmatrix} M_1 \\ M_2 \\ M_3 \\ M_4 \\ M_5 \end{Bmatrix} = \begin{Bmatrix} 1, 0, 0, 0, 0 \\ 0, 0, 1, 0, 0 \\ 0, 0, 0, 0, 1 \\ 0, 1, 0, 0, 0 \\ 0, 0, 0, 1, 0 \end{Bmatrix}$$

$$MM = \begin{Bmatrix} MM_1 \\ MM_2 \\ MM_3 \end{Bmatrix} = \begin{Bmatrix} 0, 0, 1 \\ 1, 0, 0 \\ 0, 1, 0 \end{Bmatrix}$$

$$MC = \begin{Bmatrix} MC_1 \\ MC_2 \\ MC_3 \end{Bmatrix} = \begin{Bmatrix} 1, 0, 0 \\ 0, 1, 0 \\ 0, 0, 1 \end{Bmatrix}$$

$$MM = \begin{Bmatrix} MM_1 \\ MM_2 \\ MM_3 \end{Bmatrix} = \begin{Bmatrix} 1, 0, 0 \\ 0, 1, 0 \\ 0, 0, 1 \end{Bmatrix}$$

$$MY = \begin{Bmatrix} MY_1 \\ MY_2 \end{Bmatrix} = \begin{Bmatrix} 1, 0 \\ 0, 1 \end{Bmatrix}$$

IMAGE-FORMING METHOD

BACKGROUND OF THE INVENTION

1. Field of the Invention

The present invention relates to an image-forming method and an image-forming device that reduce the generation of gaps between dots.

2. Description of Related Art

There has been proposed an image-forming device of a type such as an inkjet printer that has a recording head. The recording head moves relative to a recording medium both in a main scanning direction and in a sub-scanning direction to form images on the recording medium. The U.S. Pat. No. 4,967,203 has proposed such a type of image-forming device.

SUMMARY OF THE INVENTION

It is an object of the present invention to provide an image-forming method and an image-forming device that can form images with improved image quality.

In order to attain the above and other objects, the present invention provides an image-forming method for forming images on a recording medium based on image data by arranging image elements in lines along a main scanning direction to form main scan lines. The image-forming method includes: receiving image data including one set of main scan line data, the one set of main scan line data being one line worth of data indicative of one main scan line extending in a main scanning direction; dividing the one set of main scan line data into N number of sets of partial line data, where N is an integer greater than or equal to 2; and forming N number of partial line images based on the N number of sets of partial line data, at least one partial line image for the at least one set of partial line data being positioned differently from other partial line images for other sets of partial line data in a sub-scanning direction that is substantially orthogonal to the main scanning direction.

According to another aspect, the present invention provides an image-forming device for forming images on a recording medium based on image data by arranging image elements in lines along a main scanning direction to form main scan lines. The image-forming device includes: a receiving unit; a dividing unit; and an image forming unit. The receiving unit receives image data including one set of main scan line data, each set of main scan line data being one line worth of data indicative of one main scan line extending in a main scanning direction. The dividing unit divides the one set of main scan line data into N number of sets of partial line data, where N is an integer greater than or equal to 2. The image forming unit forms N number of partial line images based on the N number of sets of partial line data, at least one partial line image for the at least one set of partial line data being positioned differently from other partial line images for other sets of partial line data in a sub-scanning direction that is substantially orthogonal to the main scanning direction.

According to another aspect, the present invention provides an image data converting method, including: receiving image data including one set of main scan line data, the one set of main scan line data being one line worth of data indicative of one main scan line extending in a main scanning direction; and dividing the one set of main scan line data into N number of sets of partial line data, where N is an integer greater than or equal to 2, the N number of sets of partial line data indicating to form N number of partial line images, with at least one partial line image for the at least one set of partial line data being positioned differently from other partial line images for other sets of partial line data in a sub-scanning direction that is substantially orthogonal to the main scanning direction.

According to another aspect, the present invention provides an image data converting device, including: a receiving unit; and a dividing unit. The receiving unit receives image data including one set of main scan line data, the one set of main scan line data being one line worth of data indicative of one main scan line extending in a main scanning direction. The dividing unit divides the one set of main scan line data into N number of sets of partial line data, where N is an integer greater than or equal to 2, the N number of sets of partial line data indicating to form N number of partial line images, with at least one partial line image for the at least one set of partial line data being positioned differently from other partial line images for other sets of partial line data in a sub-scanning direction that is substantially orthogonal to the main scanning direction.

According to another aspect, the present invention provides a program recording medium storing a program readable by a computer, the program including: a program of receiving image data including one set of main scan line data, the one set of main scan line data being one line worth of data indicative of one main scan line extending in a main scanning direction; and a program of dividing the one set of main scan line data into N number of sets of partial line data, where N is an integer greater than or equal to 2, the N number of sets of partial line data indicating to form N number of partial line images, with at least one partial line image for the at least one set of partial line data being positioned differently from other partial line images for other sets of partial line data in a sub-scanning direction that is substantially orthogonal to the main scanning direction.

BRIEF DESCRIPTION OF THE DRAWINGS

The above and other objects, features and advantages of the invention will become more apparent from reading the following description of the preferred embodiments taken in connection with the accompanying drawings in which:

FIG. 1 is a perspective view of a multifunction device according to a first embodiment of the present invention;

FIG. 2 is a plan view of an inkjet printer, which is provided in the multifunction device of FIG. 1, and from which a top panel of a recording unit frame is removed;

FIG. 3 is a plan view of an essential part of the inkjet printer;

FIG. 4(a) and FIG. 4(b) are explanatory diagrams illustrating the operations of a print head in the inkjet printer, wherein FIG. 4(a) shows how dots are arranged on a sheet when the print head is scanned in a main scanning direction, and FIG. 4(b) shows how to form an image on a sheet by scanning the print head in the main scanning direction and in the sub-scanning direction;

FIG. 4(c) through FIG. 4(f) are explanatory diagrams showing factors for the generation of white streaks, wherein FIG. 4(c) shows how errors in nozzle positions generate white streaks, FIG. 4(d) shows the white streaks generated by the errors in nozzle positions shown in FIG. 4(c), FIG. 4(e) shows how errors in dot diameters generate white streaks, and FIG. 4(f) shows the white streaks generated by the errors in dot diameters shown in FIG. 4(e);

FIG. 13(a) shows how the probability that dots will be formed is distributed in the sub-scanning direction;

FIG. 13(b) shows how the probability that dots will be formed is distributed in the sub-scanning direction when image resolution is 1,200 dpi;

FIG. 13(c) shows how the probability that dots will be formed is distributed in the sub-scanning direction when image resolution is 2,400 dpi;

FIG. 14(a)-FIG. 14(b) are explanatory diagrams showing the relationship between dot size and the generation of gaps according to the single line process in the first embodiment, wherein FIG. 14(a) shows the relationship between dot size of 100% and the generation of gaps, and FIG. 14(b) shows the relationship between dot size of 90% and the generation of gaps;

FIG. 14(c)-FIG. 14(d) are explanatory diagrams showing the relationship between dot size and the generation of gaps according to the multiple line process in the first embodiment, wherein FIG. 14(c) shows the relationship between dot size of 100% and the generation of gaps, and FIG. 14(d) shows the relationship between dot size of 90% and the generation of gaps;

DETAILED DESCRIPTION OF THE PREFERRED EMBODIMENTS

Figure 4B:
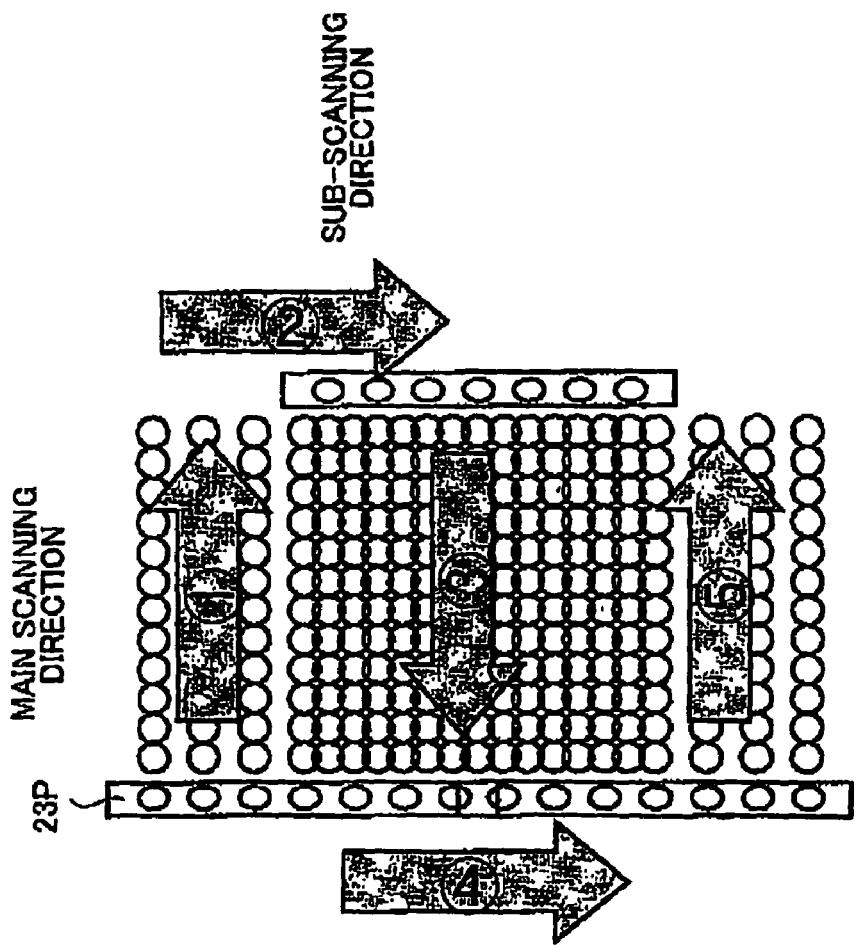

An image-forming method according to preferred embodiments of the present invention will be described while referring to the accompanying drawings wherein like parts and components are designated by the same reference numerals to avoid duplicating description.

First Embodiment

First, a multifunction device 1 according to a first embodiment of the present invention will be described with reference to FIG. 1 to FIG. 18(c).

The multifunction device 1 has printer, copier, scanner, facsimile, and telephone functions.

First, the overall structure of the multifunction device 1 will be described with reference to FIG. 1.

In the following description, the expressions "front", "rear", "upper", "lower", "right", and "left" are used to define the various parts when the multifunction device 1 is disposed in an orientation in which it is intended to be used.

As shown in FIG. 1, the multifunction device 1 is provided with a sheet supply unit 2 at its rear side. A document reader 3 is provided on the front of the sheet supply unit 2. The document reader 3 is used for the copier and facsimile functions. An ink jet printer 4 is provided under the document reader 3. The ink jet printer 4 is for implementing the printer function. A sheet discharge table 5 is provided in front of the ink jet printer 4. The sheet discharge table 5 is for receiving a paper printed by the ink jet printer 4.

Next, the configuration of the ink jet printer 4 will be described with reference to FIG. 2 to FIG. 4(f).

The ink jet printer 4 mainly includes: a print unit 10; a maintenance mechanism 11; an ink supply unit 12; and a compression air supply unit 13. The print unit 10 uses a print head 23P to print on paper (e.g., A4 or letter size paper) supplied from the sheet supply unit 2. The maintenance mechanism 11 is for performing maintenance operation of the print head 23P. The ink supply unit 12 is for supplying the print unit 10 with ink from ink cartridges 40 through 43. The compression air supply unit 13 is for supplying the ink cartridges 40 through 43 with compressed air.

The print unit 10 is housed in a flat and box-shaped recording unit frame 20 shown in FIG. 3. The recording unit frame 20 has a reinforcing top panel 20c having an opening, through which a user can access to paper. It is noted that in FIG. 2, the top panel 20c is removed from the recording unit frame 20 to facilitate understanding of the print unit 10. A guide shaft 21 is provided at the rear in the frame 20 and a guide rail 22 is provided to the front therein. Both of right and left ends of the guide shaft 21 and the guide rail 22 are fixed to a right side wall 20a and a left side wall 20b, respectively, of the recording unit frame 20. The guide shaft 21 and the guide rail 22 guide and support a carriage 23 and the print head 23P so that they can move freely horizontally. The carriage 23 and the print head 23P are driven by a carriage drive motor 24 and can reciprocate along the guide shaft 21 and the guide rail 22 in a main scanning direction via a timing belt. The print head 23P is fixed to the front of the carriage 23. The carriage 23 is guided by the guide shaft 21. The print head 23P is guided by the guide rail 22.

On the lower surface of the print head 23P, four ink jet nozzle rows 23a through 23d are provided in correspondence with four ink colors as indicated by broken lines. Each nozzle row has a plurality of ink jet nozzles 23n. A black nozzle row 23a and a cyan nozzle row 23b are located adjacent to each other. A magenta nozzle row 23c and a yellow nozzle row 23d are located adjacent to each other.

Main transport rollers (not shown) are provided below the guide shaft 21 and are supported rotatably in the print unit 10. A sheet feed motor 26 rotates the main transport rollers in a predetermined direction via a gear mechanism 27. When the sheet supply unit 2 supplies a sheet of paper, the main transport rollers transport the sheet immediately below the print head 23P almost horizontally in a paper feed direction (that is, sub-scanning direction) toward the front and discharges the sheet onto the sheet discharge table 5. The sub-scanning direction is substantially perpendicular to the main scanning direction.

The maintenance mechanism 11 has a maintenance case 30 at the right edge in the print unit frame 20 near the bottom thereof.

An ink cartridge install portion is provided at the front of the ink supply unit 12. On the ink cartridge install portion, a black ink cartridge 40, a cyan ink cartridge 41, a magenta ink cartridge 42, and a yellow ink cartridge 43 are mounted in this order from the left to the right. In the inside of each ink cartridge 40-43, a flexible film member 40a-43a is stretched over almost the entire region thereof. Each film member 40a-43a divides the inside of the cartridge into a lower ink holding chamber 40b-43b and an upper air chamber 40c-43c. Each ink holding chamber 40b-43b contains ink. Air flows into each air chamber 40c-43c. The ink holding chambers 40b through 43b in the ink cartridges 40 through 43 contain black ink BI, cyan ink CI, magenta ink MI, and yellow ink YI, respectively.

An ink needle 44 is provided at the rear of an installation portion, in which each ink cartridge 40-43 is installed. Each ink needle 44 protrudes toward the front. A base of each ink needle 44 is connected to the print head 23P via a corresponding ink supply tube 45-48. The ink supply tubes 45 and 46 are bundled together in the middle, and the ink supply tubes 47 and 48 are bundled together in the middle. The ink supply tubes 45 and 46 are positioned one on the other at their regions near to the print head 23P. Similarly, the ink supply tubes 47 and 48 are located one on the other at their regions near to the print head 23P.

The print head 23P is disposed above the ink cartridges 40-43 by a prescribed head difference. When the ink cartridges 40-43 are mounted on the installation portions, the tips of the ink needles 44 are inserted into rear portions of the flexible film members 40a-43a, as a result of which the lower ink chambers 40b-43b are fluidly connected with the print head 23P. The ink BI, CI, MI, and YI are supplied from the lower ink chambers 40b-43b to the print head 23P via the ink supply tubes 45-48. In this way, nozzles 23n in the nozzle rows 23a-23d of the print head 23P are filled with the ink BI, CI, MI, and YI supplied via the ink supply tubes 45-48.

Figure 4A:
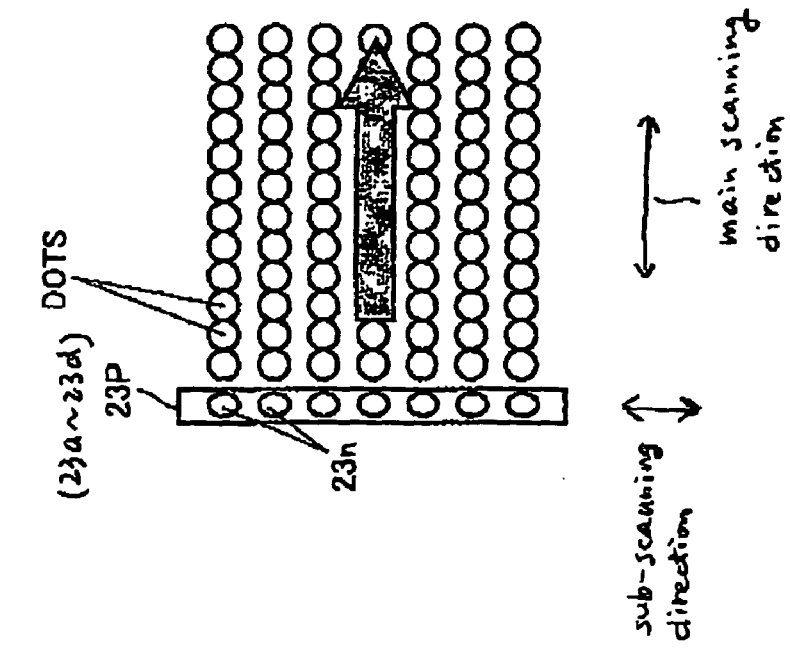

As shown in FIG. 4(a), the plurality of nozzles 23n are aligned in the sub-scanning direction in each nozzle row 23a, 23b, 23c, or 23d. While the recording head 23P is being scanned in the main scanning direction as indicated by an arrow in FIG. 4(a), each ink jet nozzle 23n in each nozzle row 23a, 23b, 23c, or 23d is selectively driven by a piezoelectric actuator (not shown) to eject an ink droplet, thereby forming a dot on a paper.

As shown in FIG. 4(b), the recording head 23P is scanned in the main scanning direction relative to the paper as indicated by arrows (1), (3), and (5), and is scanned in the sub-scanning direction as indicated by arrows (2) and (4), repeatedly, thereby forming an image on a paper.

Specifically, first, the recording head 23P is moved relative to the paper in the main scanning direction as indicated by arrow (1). Next, the recording head 23P is moved relative to the paper in the sub-scanning direction as indicated by arrow (2). Then, the recording head 23P is moved relative to the paper in the main scanning direction as indicated by arrow (3). Then, the recording head 23P is moved relative to the paper in the sub-scanning direction as indicated by arrow (4). Next, the recording head 23P is moved relative to the paper in the main scanning direction as indicated by arrow (5). It is noted that the recording head 23P is not moved in the sub-scanning direction as indicated by arrow (2) or (4), but the paper is moved in the sub-scanning direction. It is noted that the recording head 23P may be of a thermal element driving type.

Figure 4E:
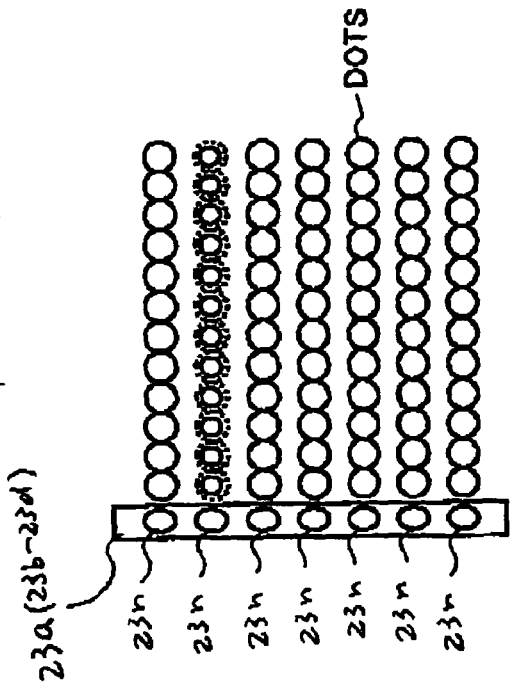
Figure 4F:
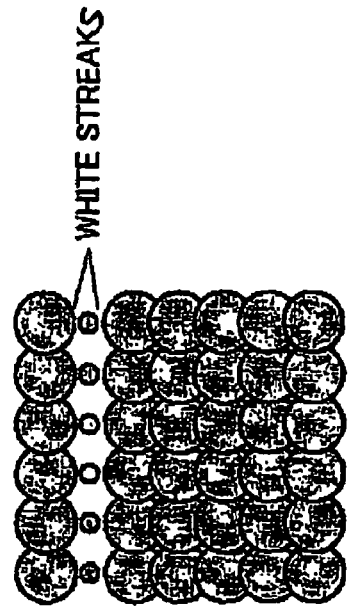
Figure 4C:
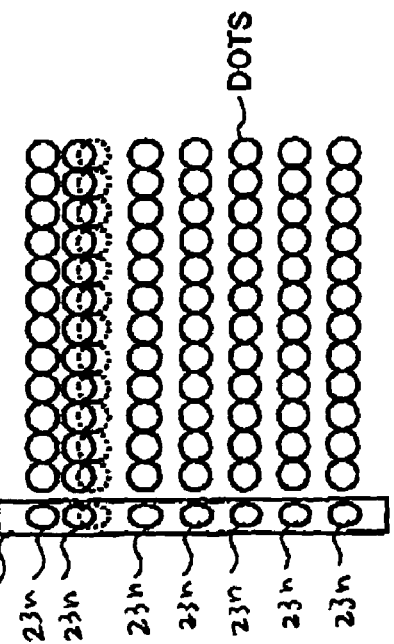
Figure 4D:
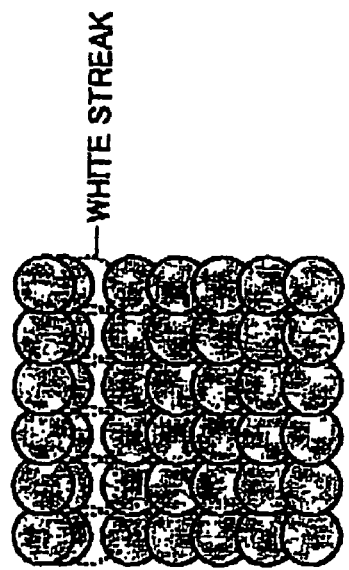

It is noted that an unusually large gap will possibly exist between adjacent nozzles 23n as shown in FIG. 4(c). In such a case, a wide gap will be formed between neighboring dots on the recording medium in the sub-scanning direction. As shown in FIG. 4(d), a concentration of these gaps between dots will be perceived as a white streak to the human eye. The white streak extends in the main scanning direction.

It is also noted that unusually small dots will possibly be ejected from some nozzle 23n as shown in FIG. 4(e). In such a case, a large gap will be formed between adjacent dots on the recording medium in the sub-scanning direction. As shown in FIG. 4(f), a concentration of these gaps between dots will be perceived also as a white streak to the human eye.

Deviations in the position of ink ejection and differences in dot size are caused by a variety of factors, including the precision of manufacturing the nozzles 23n themselves, the direction of ink ejection, the flow of air between the nozzles 23n and the recording medium, distortion or warping of the recording medium caused by ink deposition, scanning precision of the recording head 23P, and conveying precision of the recording medium.

The ink jet printer 4 can reduce the occurrence of gaps between dots even if there are irregularities in the position and size of dots formed on a recording medium in a manner described later.

Next, the electrical configuration of the inkjet printer 4 will be described with reference to the block diagram in FIG. 5.

The inkjet printer 4 includes a CPU 51, a RAM 53, and a ROM 55 that are connected to one another via a bus (not shown). The ROM 55 stores a print data generating program (FIG. 6 and FIG. 7) for instructing the CPU 51 to function as a print data generating unit. When the CPU 51 receives image data from an external device, such as the document reading unit 3 or an external personal computer connected to the multifunction device 1, the CPU 51 functions as the print data generating unit by executing the print data generating program to create print data. This print data is transmitted to the print head 23P, which then forms an image on paper based on the print data.

Next, the print data generating process executed by the print data generating unit (CPU 51) of the inkjet printer 4 will be described with reference to FIG. 6 to FIG. 8.

Figure 5:
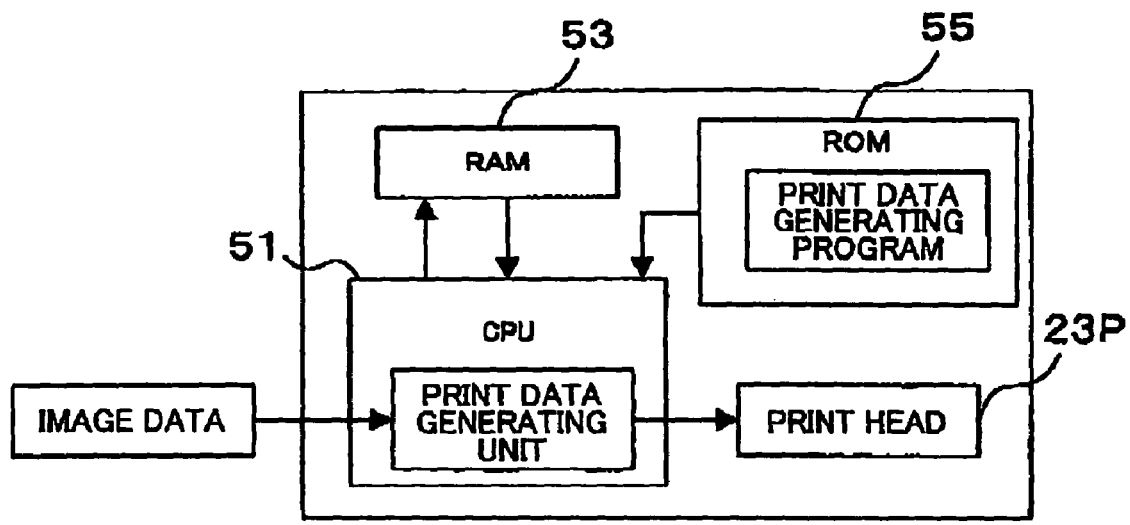
FIG. 5 is a block diagram showing the electrical configuration of the inkjet printer.
Figure 6:
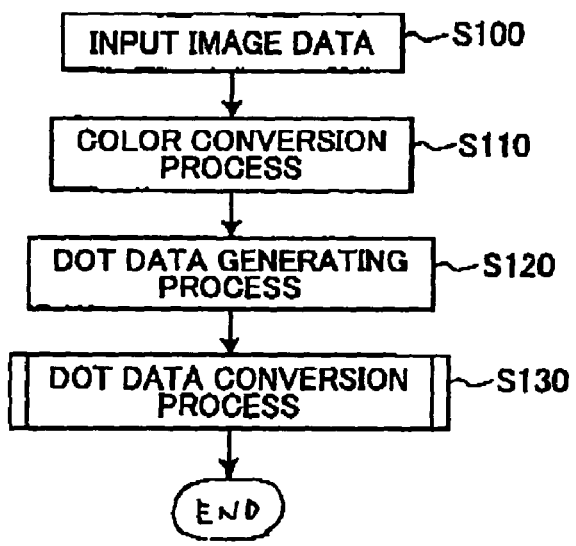
FIG. 6 is a flowchart illustrating steps in a process to generate print data.

As shown in FIG. 6, first, in S100, CMYK image data indicative of an image desired to be formed are inputted into the CPU 51 (refer to FIG. 5). The CMYK image data includes a plurality of sets of CMYK image data (C, M, Y, K) indicative of a plurality of pixels forming the desired image. Each color component C, M, Y, K in each CMYK image data set (C, M, Y, K) is specified in 256 gradations, from 0 to 255.

It is noted that the CMYK image data is added with resolution data indicative of a resolution "d (dpi)" of the desired image indicated by the image data in the main scanning direction. It is noted that the image has the resolution d not only in the main scanning direction but also in the sub-scanning direction. Accordingly, the resolution d indicates that dots should be arranged in the image by a pitch H (μm) both in the main scanning direction and in the sub-scanning direction, wherein H=25,400/d, wherein 25,400 is the value for converting units of inches to units of micrometers.

It is also noted that in the present embodiment, the CMYK image data is defined in the CMYK color space, but RGB image data defined in the RGB color space may be inputted into the CPU 51.

In S110 the CPU 51 converts each CMYK image data set (C, M, Y, K) into a CMYK ink amount data set (Cink, Mink, Yink, Kink) according to a color conversion process. Specifically, the CPU 51 uses a look-up table, stored in the ROM 55, to convert the CMYK image data (C, M, Y, K) into the CMYK ink amount data set (Cink, Mink, Yink, Kink).

The look-up table indicates: an amount of cyan ink that the print head P23 should eject to reproduce each cyan density in the range of 0 to 255; an amount of magenta ink that the print head P23 should eject to reproduce each magenta density in the range of 0 to 255; an amount of yellow ink that the print head P23 should eject to reproduce each yellow density in the range of 0 to 255; and an amount of black ink that the print head P23 should eject to reproduce each black density in the range of 0 to 255.

Accordingly, in S110, the CPU 51 refers to the look-up table and determines: the amount of cyan ink Cink that should be ejected by the print head 23P to reproduce the cyan density C in the CMYK image data (C, M, Y, K); the amount of magenta ink Mink that should be ejected by the print head 23P to reproduce the magenta density M in the CMYK image data (C, M, Y, K); the amount of yellow ink Yink that should be ejected by the print head 23P to reproduce the yellow density Y in the CMYK image data (C, M, Y, K); and the amount of black ink Kink that should be ejected by the print head 23P to reproduce the black density K in the CMYK image data (C, M, Y, K). Thus, the CPU 51 converts each set of CMYK image data (C, M, Y, K) into a set of CMYK ink amount data (Cink, Mink, Yink, Kink). Each ink amount Cink, Mink, Yink, Kink is expressed also in eight bits (256 levels).

In S120 the CPU 51 converts each of the ink amounts Cink, Mink, Yink, Kink in each set of CMYK ink amount data (Cink, Mink, Yink, Kink) into a set of dot data of either one of four levels (large dot, medium dot, small dot, or no dot) according to a dot data generating process. The dot data generating process employs a halftone process, such as an error diffusion process or a dither process.

In S130 the CPU 51 performs a dot data conversion process as will be described later with reference to FIG. 7. Also in S130, the CPU 51 transmits the converted dot data as print data to the print head 23P. The print head 23P forms an image on paper using this print data.

Next, the dot data conversion process of S130 will be described with reference to the flowchart of FIG. 7.

Figures 7, 8:
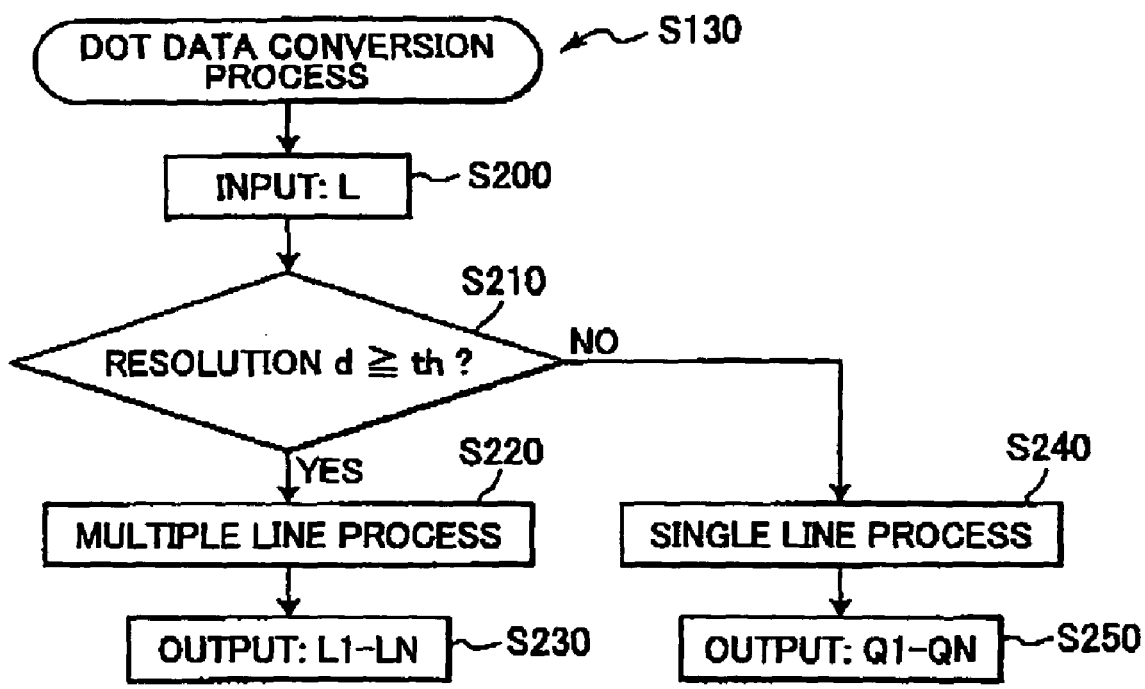
FIG. 7 is a flowchart illustrating steps in a dot data conversion process in FIG. 6.
FIG. 8 is an explanatory diagram showing a matrix used in the dot data conversion process of FIG. 7 according to the first embodiment.

In S200 of FIG. 7, the CPU 51 reads one set of line data L indicative of one line from among a large number of sets of dot data indicative of the entire image. The line data L includes a plurality of sets of dot data indicative of a plurality of dots that form one line extending in the main scanning direction.

In S210 the CPU 51 determines whether or not the resolution "d" of the line data L in the main scanning direction is greater than or equal to a threshold "th". In this example, the threshold th has a value equal to a predetermined visual resolution B (508 dpi, for example).

If the resolution d is greater than or equal to the threshold th (S210: YES), then the CPU 51 advances to S220. If not (S210: NO), then the CPU 51 advances to S240.

In S220 the CPU 51 performs a multiple line process to divide the one set of line data L into N number of sets of partial line data L1-LN, wherein N is an integer greater than or equal to two (2). In this example, N is equal to two (2), and therefore the CPU 51 divides the one set of line data L into two (N=2) sets of partial line data L1 and L2.

During the multiple line process, the CPU 51 generates one set of partial line data L1 by repeatedly placing a mask M1 over the line data L. The CPU 51 generates one set of partial line data L2 by repeatedly placing a mask M2 over the line data L. The masks M1 and M2 are indicated by the following formulas: M1=(1, 0), and M2=(0, 1) as shown in FIG. 8. The masks M1 and M2 configure a matrix M, which has elements that are either 0 or 1 and has the sum of elements in each row and each column of 1. The masks M1 and M2 are repeatedly used to cover the entire length of the line data L. The partial line data L1 is produced by repeatedly applying the mask M1 on the entire set of line data L, as in 1, 0, 1, 0, . . . . The partial line data L2 is produced by repeatedly applying the mask M2 on the entire set of line data L, as in 0, 1, 0, 1, . . . . In other words, the masks M1 and M2 satisfy the equations $L1(i)=M1(i \% j) \times L(i)$, $L2(i)=M2(i \% j) \times L(i)$, wherein i indicates the dot number in the main scanning direction; j indicates the data length of masks M1 and M2; and % is a function that determines the remainder of (i/j).

The masks M1 and M2 are configured to generate the partial line data L1 and L2, which when added together will result in the original line data L. In other words, the masks M1 and M2 ensure that $L(i)=\Sigma Lk(i)$, wherein $Lk(i)$ is the $i^{th}$ dot in the main scanning direction of the partial line data Lk (where k is 1 or 2) and $L(i)$ is the $i^{th}$ dot in the main scanning direction of the original line data L.

In S230 the CPU 51 outputs all the sets of partial line data L1-L1-LN (L1 and L2, in this example) to the print head 23P as print data.

Figure 9A:
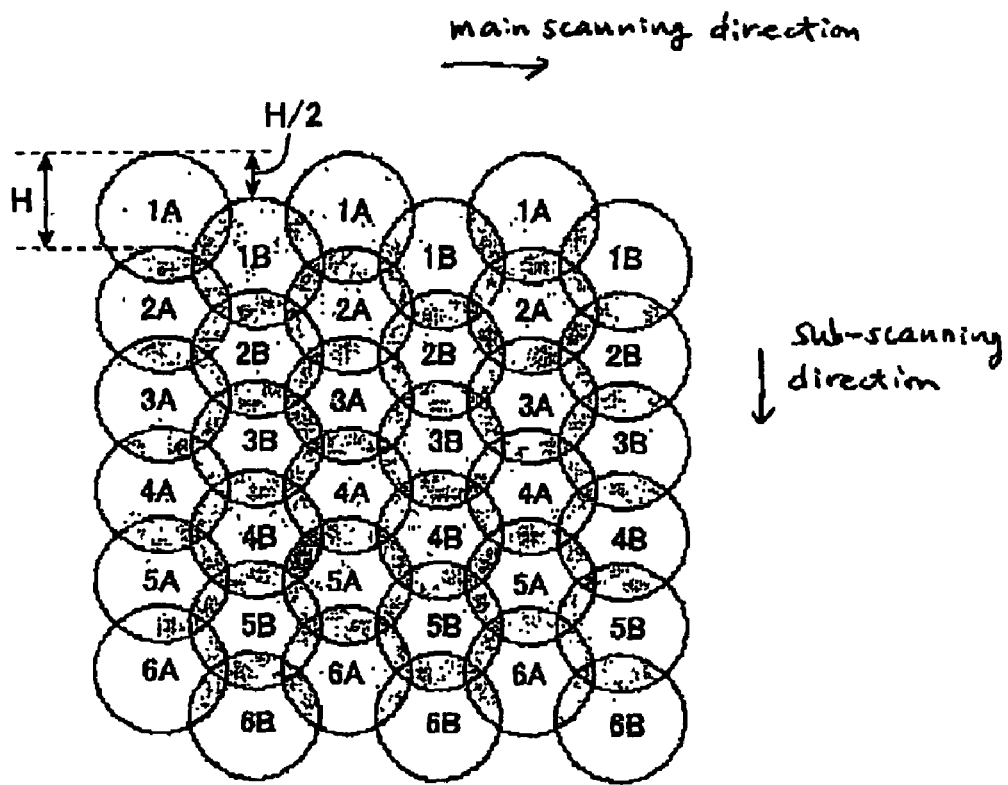
FIG. 9(a) is an explanatory diagram showing the layout of dots on paper formed according to a multiple line process in the first embodiment.
Figure 9B:
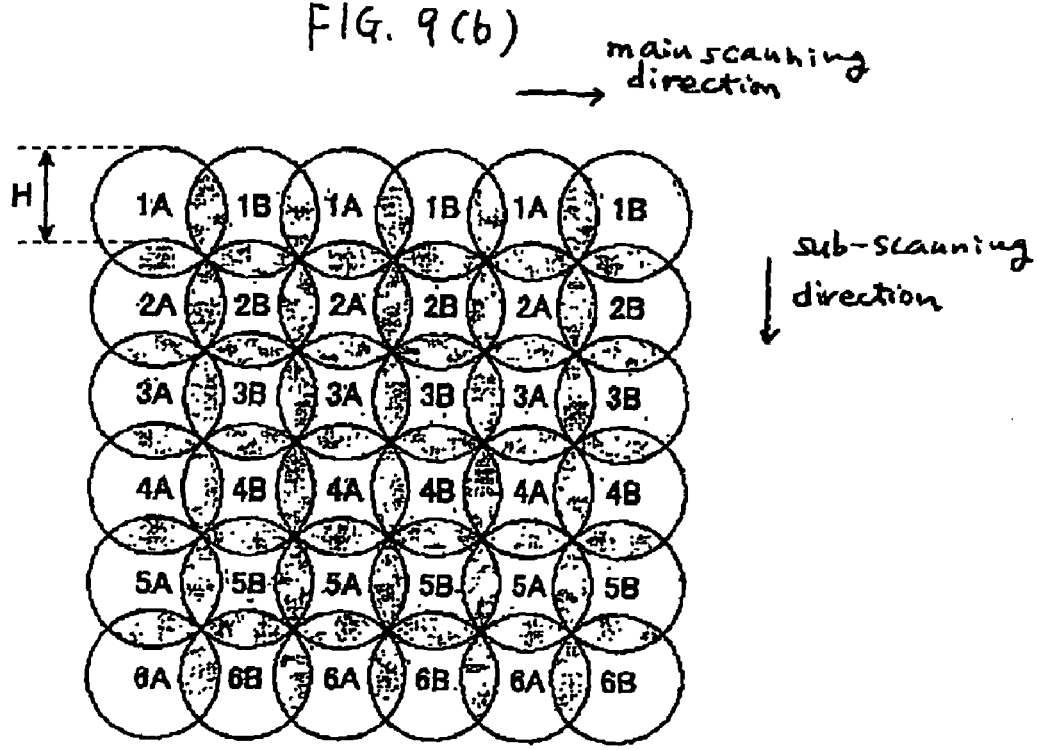
FIG. 9(b) is an explanatory diagram showing the layout of dots on paper formed according to a single line process in the first embodiment.

Upon receiving the partial line data L1 and L2 in S230, the print head 23P forms a dot image shown in FIG. 9(*a*) on paper based on the partial line data L1 and L2. More specifically, a row of dots numbered 1A is formed based on one set of partial line data L1 which is divided from one set of line data L for the first line, while a row of dots numbered 1B is formed based on another set of partial line data L2 which is divided from the same line data L for the first line.

Similarly, a row of dots numbered 2A and a row of dots numbered 2B are formed based on the partial line data L1 and L2, respectively, which are divided from a single set of line data L for the next, second line. This process follows for rows of dots 3A and 3B, 4A and 4B, and so on.

As shown in FIG. 9(*a*), dots are arranged every other place in the row 1A in correspondence with the partial line data L1 for the first row, while dots are also arranged every other place in the row 1B in correspondence with the partial line data L2 for the first row. Accordingly, in the main scanning direction, dots belonging to row 1B are positioned between dots belonging to the row 1A, and dots belonging to row 1A are between dots belonging to the row 1B.

Similarly, dots are arranged every other place in the row 2A in correspondence with the partial line data L1 for the second row, while dots are also arranged every other place in the row 2B in correspondence with the partial line data L2 for the second row. Accordingly, in the main scanning direction, dots belonging to row 2B are positioned between dots belonging to the row 2A, and dots belonging to row 2A are positioned between dots belonging to the row 2B.

For the subsequent rows, dots are formed in the same manner as described above for the first and second rows.

Thus, according to the multiple line process, each set of line data L is divided into two sets of partial line data L1 and L2, thereby doubling the number of lines in the sub-scanning direction. The pitch between neighboring partial lines is set to H/2 in the sub-scanning direction, wherein H is the original pitch in the sub-scanning direction when forming images without dividing the line data L. Accordingly, the length of the image in the sub-scanning direction is the same as when the line data L is not divided.

On the other hand, if the resolution d is less than the threshold th (S210: NO), then in S240 the CPU 51 performs a single line process to divide one set of line data L for the subject one line into N number of segments Q1-QN, wherein N is greater than or equal to two (2). The N number of segments Q1-QN are for forming the subject single line by scanning the print head 23P in the N number of scans in the main scanning direction. In this example, N is equal to two (2) and the line data L is divided into two segments Q1 and Q2.

In S250 the CPU 51 outputs the dot data in all the segments Q1-QN (Q1 and Q2, in this example) to the print head 23P as the print data.

Upon receiving the segments Q1-QN (Q1 and Q2, in this example) in S250, the print head 23P forms a dot image shown in FIG. 9(*b*) on paper based on the divided segments Q1-QN (Q1 and Q2, in this example) of line data L.

In this image, rows of dots referenced with the same reference number are formed based on the same, single set of line data L.

More specifically, a row of dots numbered 1A is formed in the first main scan of the print head 23P based on the segment Q1 in the line data L for the first line, while a row of dots numbered 1B is formed in the second main scan of the print head 23P based on the segment Q2 in the line data L for the same, first line. The print head 23P performs the first main scan and the second main scan, while maintaining unchanged the position of the print head 23P relative to the paper in the sub-scanning direction.

Similarly, a row of dots numbered 2A and a row of dots numbered 2B are formed based on the segments Q1 and Q2, respectively, of the single, second line. This process follows for rows of dots 3A and 3B, 4A and 4B, and so on. The pitch H between neighboring lines is H in the sub-scanning direction.

It is noted that in FIG. 9(*b*), dots corresponding to the segment Q1 in a set of line data L for each of the first line, the second line, . . . have the suffix A, as in 1A, 2A, . . . , and are formed in the first scan of the print head 23P for the corresponding line. Dots corresponding to the segment Q2 in a set of line data L for each of the first line, the second line, . . . have the suffix B, as in 1B, 2B, . . . , and are formed in the second scan of the print head 23P for the corresponding line.

It is noted that in S130, the processes of S200 through S230 or S250 are executed repeatedly for successive sets of line data L of the entire image.

In order to form images in four colors (magenta, cyan, yellow, and black), the CPU 51 executes the processes of S100-S130 to form an image in each of all the colors.

As described above, according to the present embodiment, the CPU 51 reads line data L for one line and determines whether the resolution of the line data L in the main scanning direction is greater than or equal to a threshold th. If the resolution is greater than or equal to the threshold th, then a multiple line process is performed on the line data L to divide this data into two sets of partial line data L1 and L2. The partial line data L1 and L2 are used to form two lines at locations shifted from each other in the sub-scanning direction. However, if the resolution of the line data L is smaller than the threshold th, then a single line process is performed to divide the line data L into two segments Q1 and Q2. The segments Q1 and Q2 of the line data L are used to form a single line at the same location in the sub-scanning direction by printing the segment Q1 in the first main scanning operation and by printing the segment Q2 in the second main scanning operation.

Next, advantages obtained by the multifunction device 1 according to the first embodiment will be described.

i) The multifunction device 1 divides one set of line data L for a single main scan line of dot data into two sets of partial line data L1 and L2 and forms two lines based on the partial line data L1 and L2 on paper. As a result, the dots cover a larger region in the sub-scanning direction than when forming only one line based on the one set of line data L on a recording medium. Accordingly, gaps between dots are less likely to occur even when the dot positions deviate in the sub-scanning direction. This effect will be described in greater detail with reference to FIG. 10(a) and FIG. 10(b).

Figure 10B:
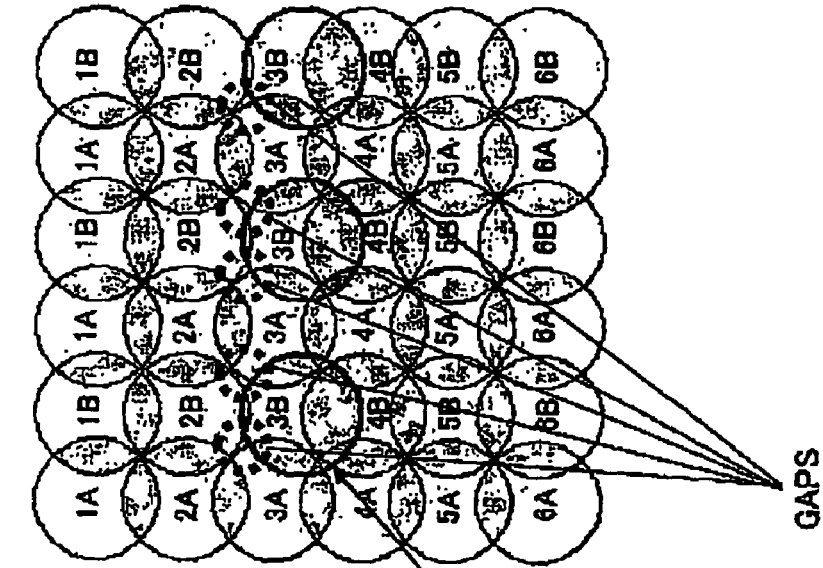
FIG. 10(b) is an explanatory diagram showing the relationship between the positional deviation of dots and the generation of gaps according to the single line process in the first embodiment.
Figure 10A:
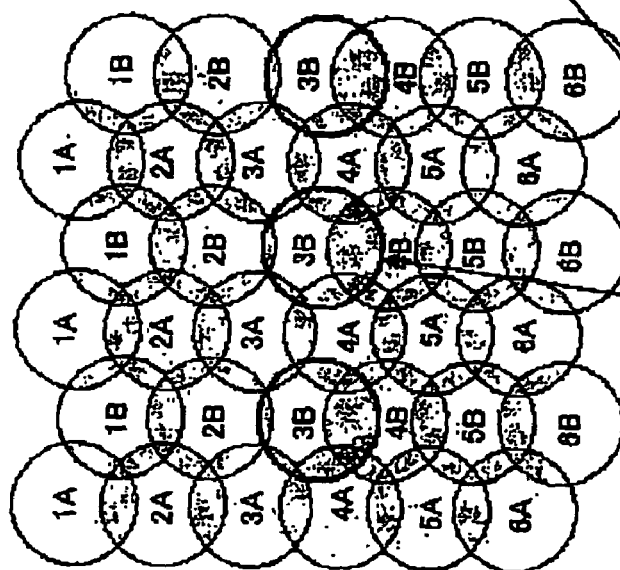
FIG. 10(a) is an explanatory diagram showing the relationship between the positional deviation of dots and the generation of gaps according to the multiple line process in the first embodiment.

FIG. 10(a) shows an image that is formed when the multifunction device 1 performs the multiple line process on dot data. The line data L for the first line is divided into partial line data L1 and L2 to form a row of dots 1A based on the partial line data L1 and a row of dots 1B based on the partial line data L2. Similarly, the rows of dots 2A and 2B are formed based on the partial line data L1 and L2, respectively, divided from a single line data L for the second line. This pattern is repeated for the rows of dots 3A and 3B, 4A and 4B, and so on.

FIG. 10(b) shows an image in which only a single line is formed on a recording medium based on each set of line data L according to the single line process. Here, rows of dots having the same numeral are formed based on line data L for the same, single line. The suffixes A and B indicate dots that are recorded in different main scans.

Specifically, the line data L for the first line is divided into segments Q1 and Q2, and dots 1A are formed based on the segment Q1 in the first main scan and dots 1B are formed based on the segment Q2 in the second main scan. Similarly, the rows of dots 2A and 2B are formed based on the segments Q1 and Q2, respectively, divided from a single line data L for the second line. This pattern is repeated for the rows of dots 3A and 3B, 4A and 4B, and so on.

It is now assumed that dots 3B in each of the images of FIG. 10(a) and FIG. 10(b) are shifted downward from the intended position by a prescribed amount.

In the image of FIG. 10(b), gaps are formed between the shifted dots 3B and the dots 2A, 2B, 3A. On the other hand, there are no gaps between the shifted dots 3B and their surrounding dots in FIG. 10(a), even though the dots 3B are shifted downward the same distance as those in FIG. 10(b). It is therefore confirmed that when the positions of dots deviate in the sub-scanning direction, gaps are less likely to appear between dots formed by the multiple line process than dots formed by the single line process.

This phenomenon will be described in greater detail with reference to FIG. 11(a) through FIG. 12(b).

Figure 11A:
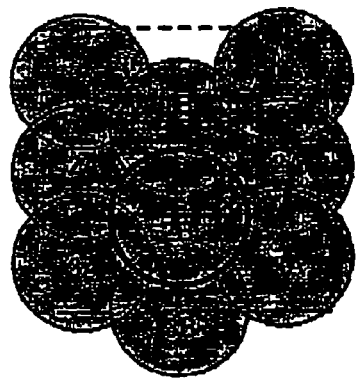
FIG. 11(a) shows a part of the dot arrangement in FIG. 10(a)

FIG. 11(a) shows a section of dots from FIG. 10(a). Here, we investigate how far a dot 2B can be shifted downward before gaps begin to appear between the dot 2B and the surrounding dots.

Figure 11C:
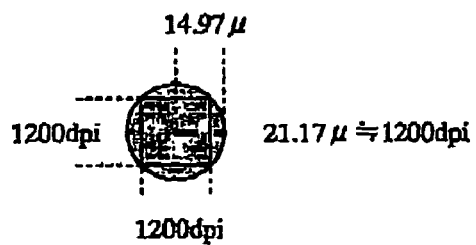
FIG. 11(c) shows the size of each dot in the dot arrangement of FIG. 11(a)
Figure 11B:
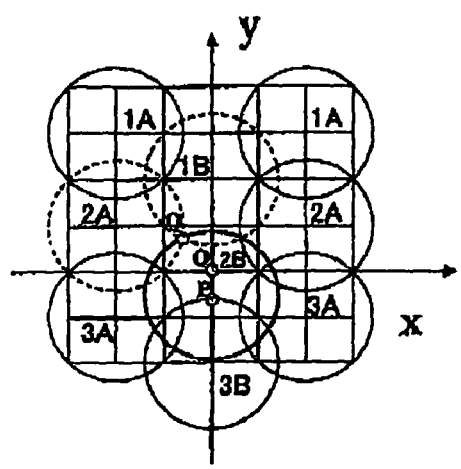
FIG. 11(b) shows the position of a dot located in the center of the dot arrangement in FIG. 11(a) when gaps first begin to appear between the subject dot and its surrounding dots as the subject dot is shifted downward.

FIG. 11(b) shows the position of the dot 2B when gaps begin to appear between the dot 2B and the dots 1B and 2A as the dot 2B is shifted downward. As shown in FIG. 11(c), each dot in FIG. 11(b) is a circle with radius 14.97 μm (corresponding to 1200 dpi). A square inscribed in this circle has sides with the length 21.17 μm. This length is equivalent to two unit lengths on the x- and y-axes in FIG. 11(b).

When the dot 2B does not deviate from its intended position, the center of the dot is point O. When the dot 2B is shifted downward until a gap begins to form between this dot and dots 2A and 1B at point Q, the center of the dot 2B is point P. Since the point Q is at the intersection between a circle (dot 1B) of radius 14.97 μm centered on the point (0, 21.17) and a circle (dot 2A) of radius 14.97 μm centered on the point (−21.17, 10.58), the coordinates of the point Q can be calculated as (−6.48, 7.68). Further, since the point P lies on the y-axis and the distance PQ is 14.97 μm, equivalent to the radius of a dot, the coordinates of the point P can be calculated as (0, −5.81). Hence, the distance OP is 5.81 μm. Accordingly, gaps between the dot 2B and surrounding dots are not generated until the dot 2B is shifted downward 5.81 μm. In other words, the tolerable deviation of dots in the dot-arrangement of FIG. 11(a) is 5.81 μm.

Figure 12A:
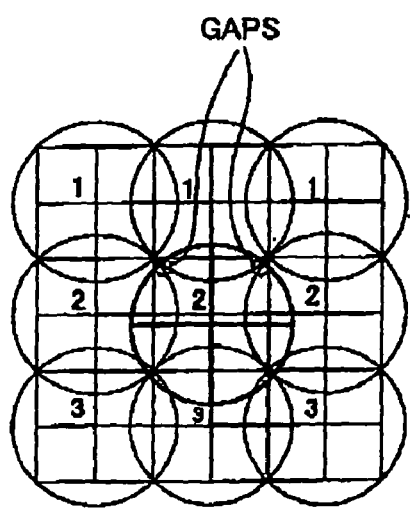
FIG. 12(a) shows the position of a dot in the dot arrangement of FIG. 10(b) when gaps first begin to appear between the subject dot and its surrounding dots as the subject dot is shifted downward.
Figure 12B:
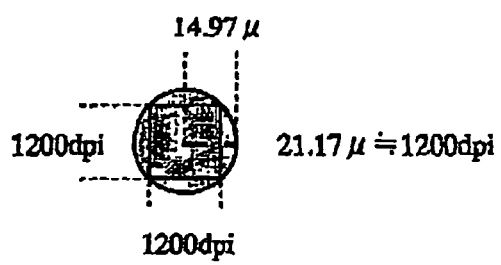
FIG. 12(b) shows the size of each dot in the dot arrangement of FIG. 12(a)

FIG. 12(a) shows a segment of the dots from FIG. 10(b). As shown in FIG. 12(b), the size of these dots is the same as those in FIG. 11(c). If a dot with the number 2 positioned in the center of the dot arrangement in FIG. 12(a) is shifted downward even slightly, gaps appear between this dot and neighboring dots. Hence, the tolerable deviation of dots in FIG. 12(a) is zero (0). Therefore, it can be seen that the multiple line process increases the tolerable deviation of dots in comparison with the single line process.

Next, FIG. 13(a)-FIG. 13(c) will be used to describe how gaps are not likely to appear between dots according to the multiple line process, even when the dots deviate in the sub-scanning direction.

Factors that cause dots to deviate in the sub-scanning direction include precision in manufacturing the nozzle pitch, precision in the direction of ink ejection, scanning precision of the print head, and conveying precision of the recording medium. The factors appear as uncontrollable noise of individual machines, individual scan timings, and the like. Accordingly, as shown in FIG. 13(a), deviations in the recording position of dots with respect to the sub-scanning direction can be expressed as the probability that dots will be formed.

As the resolution in the sub-scanning direction increases from 1,200 dpi as shown in FIG. 13(c) to 2,400 dpi as shown in FIG. 13(b), the probability distribution becomes overlapped more denser, resulting in decrease in a probability that there will be regions with no overlapping dots. If the probability of dot formation is zero (0) at some place in the sub-scanning direction, this means that color of a region of the recording medium, per se. will definitely be seen. Contrarily, the densely overlapping distribution of dots indicates that white streaks are not likely to be seen.

According to the multiple line process, the line data L for one main scan is divided into two sets of partial line data L1 and L2, and the lines corresponding to the partial line data L1 and L2 are formed on a recording medium at different positions in the sub-scanning direction, thereby doubling the resolution in the sub-scanning direction. Accordingly, this method can reduce the probability of white streaks appearing. These advantages can be increased by setting the number N of the partial line data sets L1-LN, into which the original single line data L is divided, to a larger value, such as 3, 4, 5, or the like.

ii) In the multifunction device 1, line data L for one line of the image data is divided into two sets of partial line data L1 and L2, and two lines corresponding to this partial line data L1 and L2 are formed on paper at different positions in the sub-scanning direction. Accordingly, the area of the region, in which dots are formed according to the multiple line process, is larger than the area of the region, in which dots are formed according to the single line process. Hence, gaps between dots are not likely to appear, even when the sizes of the dots are smaller than the intended size. This effect will be described in greater detail below.

Figure 14A:
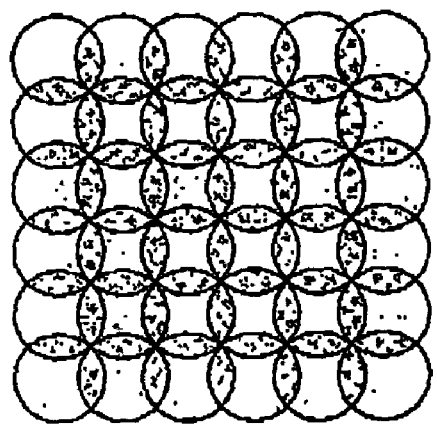
Figure 14B:
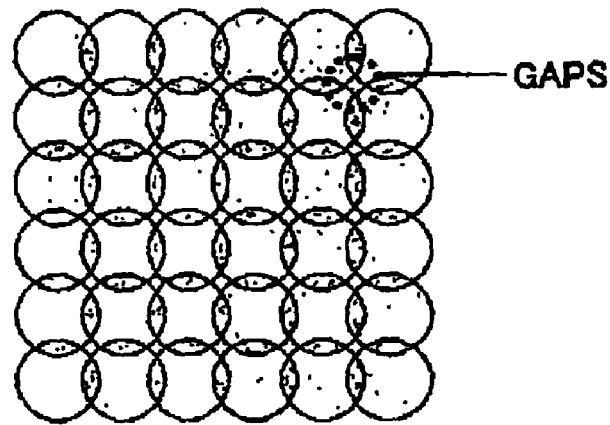

FIG. 14(a) and FIG. 14(b) show images that are formed according to the single line process, wherein FIG. 14(a) is related to the case where the size of dots is equivalent to the intended size, while FIG. 14(b) is related to the case where the dots are 90% of the intended size.

Figure 14C:
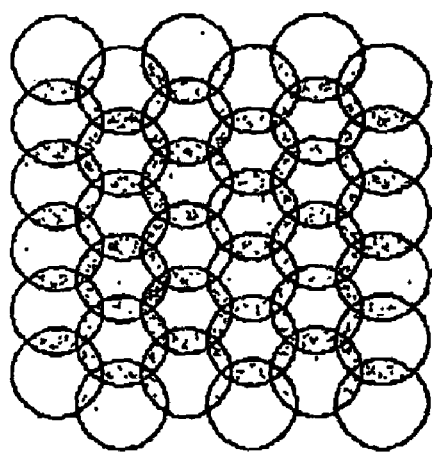
Figure 14D:
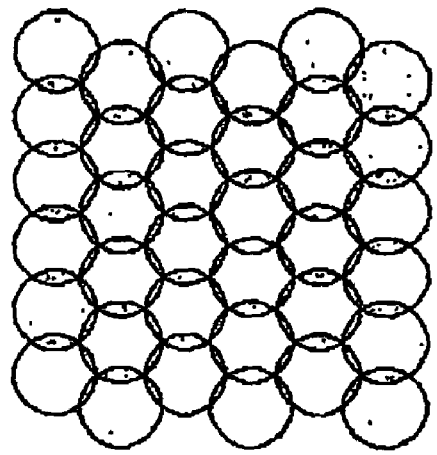

FIG. 14(c) and FIG. 14(d) show images that are formed according to the multiple line process, wherein FIG. 14(c) is related to the case where the size of dots is equivalent to the intended size, while FIG. 14(d) is related to the case where the dots are 90% of the intended size.

According to the single line process, though no gaps appear between dots when the dot size is 100% of the intended size as shown in FIG. 14(a), gaps do appear between dots when the dot size is 90% of the intended size as shown in FIG. 14(b).

However, according to the multiple line process, gaps do not appear between dots even when the dot size is 90% of the intended size as shown in FIG. 14(d), similarly to when the dot size is 100% of the intended size as shown in FIG. 14(d).

It is therefore confirmed that gaps are not likely to appear between dots when the dots are formed according to the multiple line process, even when the dot size is smaller than the intended size.

This phenomenon will be described in greater detail with reference to FIG. 15(a)-FIG. 16(b).

Figure 15A:
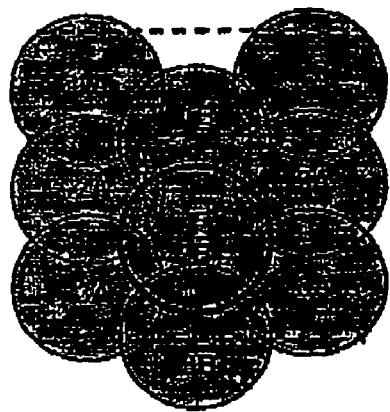
FIG. 15(a) shows a part of the dot arrangement in FIG. 14(c)

FIG. 15(a) shows a section of the dots in FIG. 14(c). Here, we will investigate how small the dot 2B becomes before gaps begin forming between the dot 2B and neighboring dots.

Figure 15C:
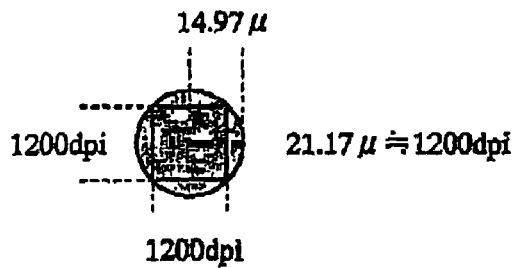
FIG. 15(c) shows the size of each dot in the dot arrangement of FIG. 15(a)
Figure 15B:
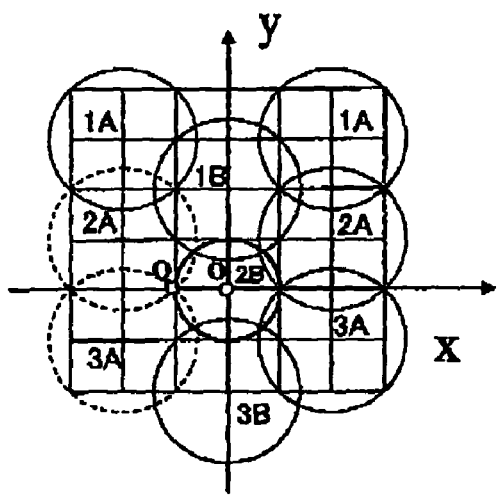
FIG. 15(b) shows the size of a dot located in the center of the dot arrangement in FIG. 15(a) when gaps first begin to appear between the subject dot and its surrounding dots as the subject dot is reduced in size.

FIG. 15(b) indicates the size of the dot 2B when gaps begin to form between the dot 2B and the dots 2A and 3A as the dot 2B is reduced in size. Each dot in FIG. 15(b) is a circle with radius (intended radius) 14.97 μm (equivalent to 1200 dpi) as shown in FIG. 15(c). A square inscribed in this circle has sides with the length 21.17 μm, which is equivalent to two unit lengths on the x- and y-axes in FIG. 15(b).

The center position of the dot 2B is point O. A gap is formed between the dot 2B and the dots 2A and 3A at a point Q when the radius of dot 2B becomes smaller than the line segment OQ. The point Q is an intersecting point on the left side of the dot 23 between dots 2A and 3A and has the coordinates (−10.58, 0). It is therefore known that no gaps appear between the dot 2B and the neighboring dots if the radius of the dot 2B is 10.58 μm or greater. In other words, in the dot-arrangement of FIG. 15(a), the radius of the dots may be reduced from 14.97 μm down to 10.58 μm, while preventing the generation of gaps. In other words, the minimum dot diameter required to prevent gaps from forming between dots is 10.58 μm, which is about 70% of the intended dot diameter.

Figure 16A:
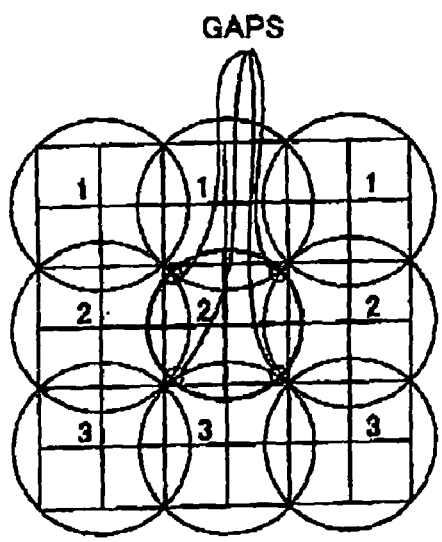
FIG. 16(a) shows the size of a dot in the dot arrangement of FIG. 14(a) when gaps first begin to appear between the subject dot and its surrounding dots as the subject dot is reduced in size.
Figure 16B:
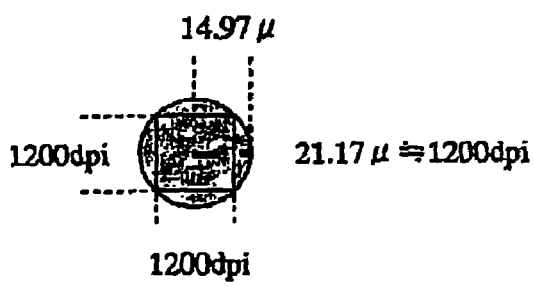
FIG. 16(b) shows the size of each dot in the dot arrangement of FIG. 16(a)

FIG. 16(a) shows a section of dots from FIG. 14(a). As shown in FIG. 16(b), the intended size of each dot in the dot-arrangement is the same as that in FIG. 15(a). If the size of a dot having the numeral 2 in the center of the dot-arrangement of FIG. 16(a) becomes even slightly smaller, gaps appear between this dot and the neighboring dots. Therefore, the tolerable error in dot size for the dots in FIG. 16(a) is zero (0). In other words, the minimum dot diameter required to prevent gaps from forming between dots is 14.97 μm, which is the intended dot diameter.

As described above, gaps do not form according to the multiple line process, even when the dot diameter is approximately 70% of the intended diameter. Therefore, the multiple line process has a high tolerance for variations in dot diameter and is less likely to generate gaps when using smaller dot diameters than the single line process.

When it is possible to use smaller dot sizes in this way, it is less possible to perceive dots as being granular, making it possible to improve graininess (surface roughness) in the image.

iii) In the above-described example, the threshold th is set equal to the visual resolution B (508 dpi, in this example). One set of line data L in the dot data is divided into a set of partial line data L1 and a set of partial line data L2 only when the resolution "d" of the line data in the main scanning direction exceeds the visual resolution B. This method avoids unevenness in the periphery of regions, in which dots are formed, from appearing noticeable.

Figure 17:
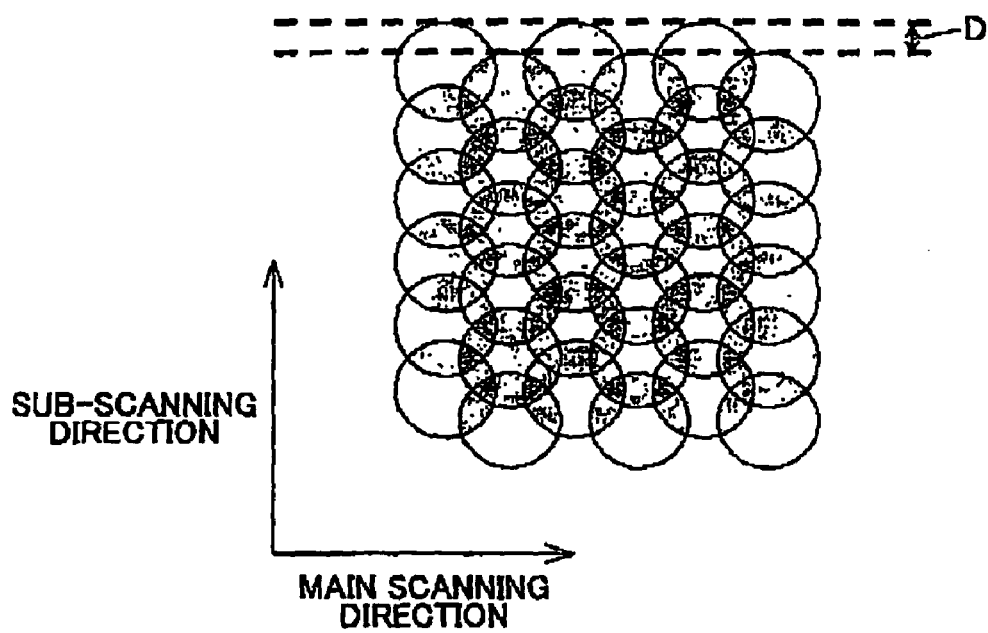
FIG. 17 is an explanatory diagram showing how unevenness is noticeable according to the size of dots.

Specifically, when images are formed by dividing line data L into partial line data L1 and L2, the dot density in the main scanning direction becomes a half of the original dot density as shown in FIG. 17.

If the dot diameter is relatively large, unevenness can easily be seen in the periphery of dot formation areas. According to the present embodiment, however, the multiple line process is not executed to divide the line data L into partial line data L1 and L2 if the resolution d of dot data in the main scanning direction is smaller than the visual resolution B (508 dpi, in this example), in other words, if the dots are so large that humans can perceive the dots visually. Accordingly, the present embodiment avoids unevenness in the periphery of dot formation areas from becoming noticeable.

More specifically, as shown in FIG. 17, a gap D indicating unevenness in the periphery of a dot formation area is defined as equal to a value of $(N-1)/N$ $(=(2-1)/2=½$, where $N=2$, in this example) of the dot size. The unevenness will be noticeable if the gap D (½ the dot size) is greater than a human's perceptible size limit (hereinafter referred to as "perceptible limit") $\chi$ (μm).

Figure 18A:
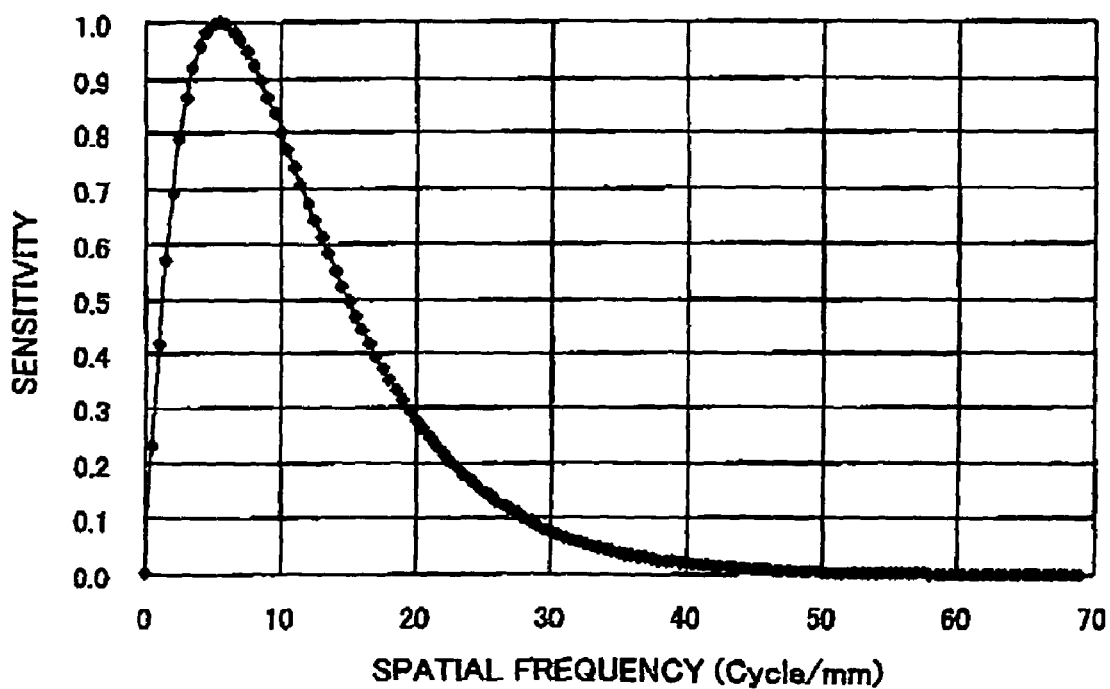
FIG. 18(a) is a graph showing visual spatial frequency response.

When the distance between the viewer's eye and the recording medium (hereinafter referred to as the "observation distance C") is 350 mm, then usually the viewer can perceive stripes with spatial frequency of up to 10 (cycles/mm) as shown in FIG. 18(a). Spatial frequency of 10 (cycles/mm) is equivalent to dot density of 20 (dots/mm). This is because one cycle of stripe is defined by two dots (a white dot and a black dot). The dot density of 20 (dots/mm) is equivalent to a dot size of 50 (μm) (=1/20 (dots/mm)). As the spatial frequency increases, the dot size decreases.

In other words, dots formed on a recording medium at a size of 50 μm or greater appear grainy to the human eye when the document or printed matter is viewed at the distance of 35 cm. In other words, the perceptible limit $\chi$ (μm/dot) is equal to 50 μm when the observation distance C is equal to 350 mm. It is therefore known that the unevenness in the periphery of the image formation region shown in FIG. 17 will appear noticeable when viewed at the observation distance C of 350 mm if the amount D of the unevenness (that is, $(N-1)/N$ (½, in this example) the dot size) becomes greater than the perceptible limit $\chi$ (=50 μm).

It is noted that the visual resolution B (dpi) is defined as the upper limit of resolution, at which the human eye can perceive dots as grains. The visual resolution B (dpi) can therefore be expressed by the perceptible limit $\chi$ according to the following formula:

$$B \text{ (dpi)} \approx \{25.4 \text{ (mm/inch)}\}/\{(\chi/1000)\text{(mm/dot)}\},$$

wherein 25.4 is the value for converting units of inches to units of millimeters. It is therefore known that the perceptible limit $\chi$ of 50 (μm) is equivalent to the visual resolution B of 508 dpi. It is therefore known that when the dot resolution d of the line data L is smaller than 508 dpi, if the line data L were divided into partial line data L1 and L2 to attain the unevenness D of $(N-1)/N$ (½, in this example) the dot size, the unevenness D will become greater than the perceptible limit $\chi$ of 50 μm when the recorded material is viewed from the observation distance of 350 mm and therefore will become noticeable. In other words, when the dot resolution of the line data L is greater than or equal to 508 dpi, even if the line data L is divided into partial line data L1 and L2 to attain the unevenness D of (N−1)/N (½, in this example) the dot size, the unevenness D will become smaller than or equal to the perceptible limit χ of 50 μm when the recorded material is viewed from the observation distance of 350 mm and therefore will become unnoticeable.

According to the present embodiment, therefore, the threshold "th" is set equal to the visual resolution of 508 dpi for observation distance of 350 mm, and the multiple line process is executed only when the dot resolution of the line data L is greater than or equal to 508 dpi. This ensures that even when the line data L is divided into partial line data L1 and L2, the unevenness D obtained by the division (½ the dot size) will become smaller than or equal to the perceptible limit χ of 50 μm when the recorded material is viewed from the observation distance of 350 mm and therefore will become unnoticeable.

Generally, the perceptible limit χ (μm) and the observation distance C (mm) have the following relationship:

$$\chi \text{ (μm)} = 50 \text{ (μm)} \times C\text{(mm)}/350 \text{ (mm)}.$$

Accordingly, the visual resolution B can be expressed by the observation distance C by the following formula:

$$B\text{(dpi)} \approx 177,800/C\text{(mm)}.$$

Accordingly, the threshold "th" may be set to another value of the visual resolution B that corresponds to an arbitrary observation distance C and that is different from 508 dpi.

Figures 18B, 18C:
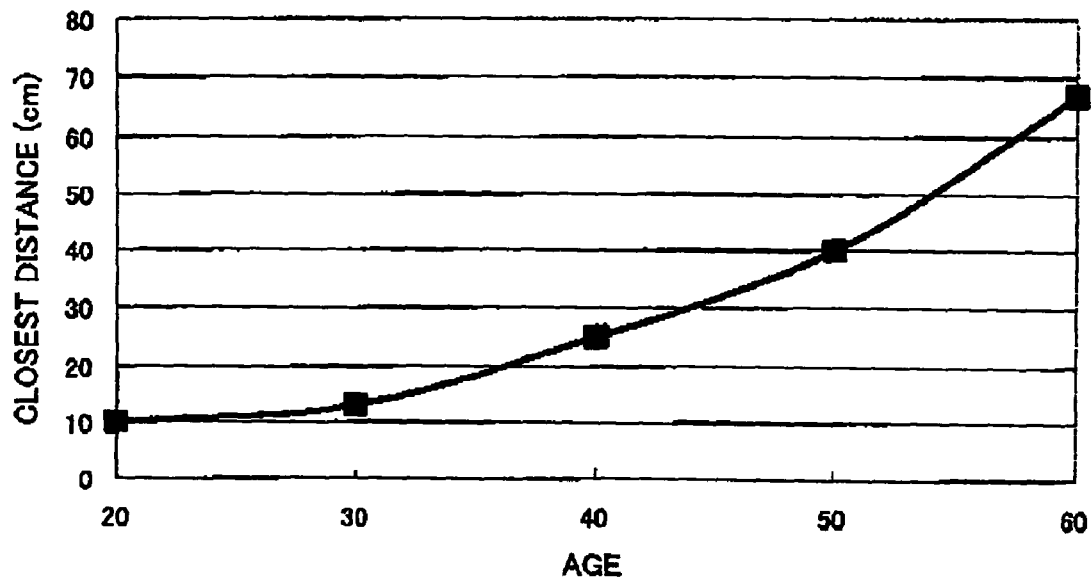
FIG. 18(b) is a graph showing how the closest distance changes according to age.
FIG. 18(c) shows the relationship between a recording density and a dot diameter.

For example, the observation distance C may be determined based on estimates of how the outputted medium will be viewed. For example, when a large photograph size (3.5"× 5") or a much larger photograph size (5"×7") is selected as the size of the recording medium, it is supposed that a viewer will observe fine details of the printed medium. In this circumstance, it is desirable to set the observation distance C to a "closest distance". The closest distance is defined as a distance between the printed material and the position of the viewer's eye just before the image blurs as the eye is brought closer to the printed medium. As shown in FIG. 18(b), the closest distance varies depending on the viewer and on the viewer's age, but can be estimated as about 10 cm.

Hence, if a recording medium of size of (3.5"×5") or (5"× 7") has been selected, the observation distance C may be set to 10 (cm), and the visual resolution B is calculated as about 1,800 (dpi) (=177,800/100 (mm)). In this case, the threshold th is set equal to the visual resolution B of 1,800 dpi.

On the other hand, if A4 size (8"×12") is selected as the size of the recording medium, the observation distance C is preferably set to 30 cm, which is an appropriate distance for viewing a document or similar printed matter. The visual resolution B is calculated as about 600 (dpi) (=177,800/300 (mm)). In this case, the threshold th is set equal to the visual resolution B of 600 dpi.

On the other hand, if a poster size (19"×13") is selected, the observation distance C is set at 100 cm. The visual resolution B is calculated as about 180 (dpi) (=177,800/1000 (mm)). In this case, the threshold th is set equal to the visual resolution B of 180 dpi.

The observation distance C may vary also according to the type of input data rather than the selected size of the recording medium. For example, when the input data is image data such as photograph, it is presumed that a viewer will gaze at the outputted material, so the observation distance C may be set to 10 (cm) and the visual resolution B may be calculated as about 1,800 (dpi) (=177,600/100 (mm)). In this case, the threshold th is set equal to the visual resolution B of 1,800 dpi.

On the other hand, if the input data is text, then the observation distance C may be set to 30 cm, which is appropriate for viewing documents and similar printed matter. The visual resolution B is calculated as about 600 (dpi) (=177,800/300 (mm)). In this case, the threshold th is set equal to the visual resolution B of 600 dpi.

The observation distance C may be set to any other optimal values based on an estimation. The user may also be allowed to input an observation distance C directly to the printer 4. The printer 4 will calculate the visual resolution B based on the observation distance C and will set the threshold th equal to the visual resolution B.

iv) As shown in FIG. 17, at least a (N−1) (one, in this example) dot's worth of gap is formed between successive dots in the main scanning direction when dots are formed based on the partial line data L1-LN. In this example, at least one (=2−1) dot's worth of gap is formed between successive dots in the main scanning direction when dots are formed based on the partial line data L1 and L2. Therefore, the print head 23P forms at most every other dot instead of forming dots continuously in the main scanning direction, thereby improving the speed of the print head 23P in the main scanning direction and reducing the time required to form the image.

In other words, the distance or interval between dots in each set of partial line data Li (i=1, . . . , N) is set to N dots' worth of distance. That is, the distance or pitch between dots in each set of partial line data Li (i=1, . . . , N) is set to NH. Thus, dots are formed at most every N dots when forming images while scanning in the main scanning direction. In other words, dots are formed at an interval greater than or equal to N dots.

In this example, the distance or interval between dots in each set of partial line data L1, L2 is set to two dots' worth of distance. That is, the distance or pitch between dots in each set of partial line data L1, L2 is set to 2H. Thus, dots are formed at most every two dots when forming images while scanning in the main scanning direction. In other words, dots are formed at an interval greater than or equal to two dots.

Accordingly, the scanning speed can be made faster than when the distance between dots is one dot's worth of distance, thereby shortening the time required to form images.

In the present embodiment, partial lines are offset in the sub-scanning direction by H/N, wherein a line pitch H (μm) indicates an original pitch of image data in the sub-scanning direction, that is, a distance between each two adjacent sets of original line data L. Accordingly, dots are formed at equal intervals when recording is normal.

In the present embodiment, division is executed only when the value of the main-scan-line resolution d is greater than or equal to the threshold "th". This is because when the value of the resolution d is less than the threshold th, the gap between dots is so large that the effect of division will become small. If division were executed when the main scan line resolution is low, the spaces between dots in the partial lines would increase and appear grainy, and the time required to form images would be unnecessarily long. By not executing division when the main scan line resolution is low, it is possible to prevent formation of partial lines, thereby preventing images from appearing grainy and preventing the time required to form images from becoming unnecessarily long.

<First Modification>

According to the above-described embodiment, in S210, resolution "d" of the image data in the main scanning direction is determined by referring to the resolution data included in the image data, and is compared with the visual resolution "B" (threshold th).

Instead, resolution "A" (dpi) of image data in the sub-scanning direction may be calculated by the following formula:

$$A \text{ (dpi)} = 25,400/H,$$

wherein a line pitch H (μm) indicates the original pitch of image data in the sub-scanning direction, that is, a distance between each two adjacent sets of line data L.

Then, the resolution "d" in the main scan line may be set equal to the sub-scan-line resolution "A" (dpi), and then be compared with the visual resolution B (dpi) (threshold th).

<Second Modification>

It is noted that image data originally has a resolution of A (dpi)=25,400/H in the sub-scanning direction before each set of line data L in the image data is divided into N (2, in this example) sets of partial line data L1 ... LN (L1 and L2, in this example), but has a resolution of N×A (dpi)=N×25,400/H in the sub-scanning direction after each set of line data L in the image data is divided into N (N=2, in this example) sets of partial line data L1-LN (L1-L2, in this example). On the other hand, the image data has the resolution of A (dpi)=25,400/H in the main scanning direction both before and after each set of line data L in the image data is divided into N (N=2, in this example) sets of partial line data L1-LN (L1-L2, in this example).

Considering the number of divisions N, therefore, in S210, resolution "N×A" (dpi), which the image data will have in the sub-scanning direction after the division, may be compared with the visual resolution B (dpi) (threshold th).

<Third Modification>

In the above-described embodiment, the threshold "th" is set to the visual resolution of 508 dpi while estimating the observation distance C as 350 mm. However, the threshold "th" may be set to 300 dpi rather than to 508 dpi even while estimating the observation distance C as 350 mm. This is because the external personal computer normally sets, according to a printer driver program, a recording density of image data to either one of predetermined several discrete values: 300 dpi, 600 dpi, 1,200 dpi, 2,400 dpi, 3,600 dpi, 4,800 dpi, and 6,000 dpi. A half dot size is determined for each recording density as shown in FIG. 18(c). As apparent from FIG. 18(c), when the recording density is 300 dpi, a half dot size is close to but smaller than 50 μm. It is therefore known that a half dot size will be smaller than 50 μm when the recording density is greater than or equal to 300 dpi.

<Fourth Modification>

Assuming the observation distance C to 10 (cm) rather than to 35 (cm), the threshold "th" may be set to a value in a range of 1,300 dpi to 2,400 dpi. The upper limit 1,800 dpi of this range is determined by calculating the visual resolution B (=177,800/100 (mm)) for the observation distance C of 10 (cm). The lower limit 2,400 dpi is determined as the smallest recording density from among the recording densities 2,400 dpi, 3,600 dpi, 4,800 dpi, and 6,000 dpi in FIG. 18(c) that are greater than the value of 1,800 dpi.

<Fourth Modification>

Or, the threshold "th" may be set to another recording density 600 (dpi) that is also listed in FIG. 16(c). The resolution A×N (dpi)=(25,400/H)×N, which the image data will have in the sub-scanning direction after division, may be compared with the recording density of 600 (dpi).

<Fifth Modification>

In the multiple line process, the line data L may be divided into five sets of partial line data L1, L2, L3, L4, and L5, rather than into two sets of partial line data L1 and L2. That is, the number N of division is set to five (5) in this modification. This division is accomplished by applying five masks M1, M2, M3, M4, and M5 shown in FIG. 19 to the line data L.

Figures 19, 20, 21:
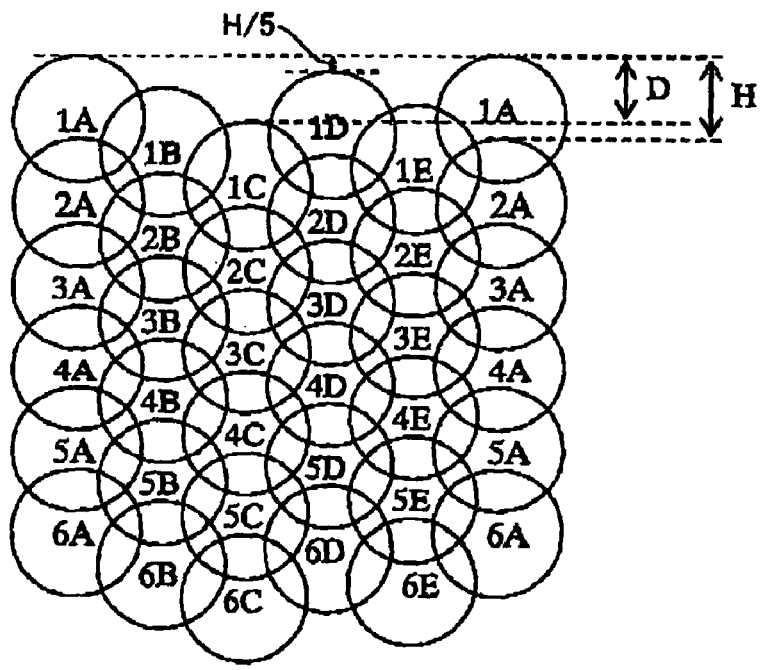
FIG. 19 is an explanatory diagram showing a matrix used in the multiple line process in FIG. 7 according to a fifth modification.
FIG. 20 is an explanatory diagram showing the layout of dots formed on paper according to the multiple line process in the fifth modification.
FIG. 21 is an explanatory diagram showing a matrix used in the multiple line process in FIG. 7 for magenta according to a sixth modification.

As shown in FIG. 20, the line data L for the first line is divided to form a line of dots 1A based on the partial line data L1, a line of dots 1B based on the partial line data L2, a line of dots 1C based on the partial line data L3, a line of dots 1D based on the partial line data L4, and a line of dots 1E based on the partial line data L5. This formation of lines is similarly performed for all subsequent line data L. Since the pitch of neighboring lines for partial line data L1-L5 is H/5, the length of the image in the sub-scanning direction is no different than when the line data L is not divided.

As shown in FIG. 20, gaps formed between neighboring dots in each set of partial line data L1-L5 in the main scanning direction are wider than those formed in the first embodiment. Hence, the recording head can scan faster in the main scanning direction, reducing the time required to form the image.

In order to ensure that unevenness in an image formed by dividing the line data L N times will be unnoticeable, the pitch (H/N) between neighboring partial lines L1-LN has to be narrower than or equal to the perceptible limit χ (μm).

It is also noted that as shown in FIG. 20, when the line data L is divided by N, the gap D indicating the unevenness can be defined as D=H×(N−1)/N. It can therefore be said that unevenness can be unnoticeable when the pitch H satisfies the following inequality:

$$H \leq (N/(N-1)) \times (\chi \text{ (μm)}).$$

For example, if the observation distance is 350 mm and therefore the perceptible limit χ (μm) is 50 μm, and if N=5, it is known that unevenness is not discernible when H≦62.5 μm (=(5/4)×50 (μm)). It is therefore known that unevenness is not discernible when the main scan line resolution d, that is, the original sub-scan line resolution A is 400 dpi (≈25,400/62.5) or greater.

In general terms, unevenness is not discernible when the main scan line resolution "d", in other words, the original sub-scan line resolution "A", is greater than or equal to 25,400/[(N/(N−1))×(χ (μm))] dpi. According to the present modification, therefore, in S210, the threshold th is set to the value of 25,400/[(N/(N−1))×(χ (μm))] dpi. The main scan line resolution d is calculated as being equal to the sub-scanning direction resolution A (dpi) of 25,400/H, and is compared with the threshold "th".

Since the distance between successive dots in each partial line is set to five (N=5) dots in the present modification, dots are formed at most every five (N=5) dots when forming images while scanning in the main scanning direction. In other words, dots are formed at an interval greater than or equal to five (N=5) dots. Accordingly, the scanning speed can be made faster than when the distance between successive dots is four or less, thereby shortening the time required to form images.

<Sixth Modification>

According to the present modification, the line data L is divided into three sets of partial line data for each of two colors magenta and cyan. In the following description, the magenta line data is represented by LM, and the corresponding partial line data is LM1, LM2, LM3, and the cyan line data is represented by LC, and the corresponding partial line data is LC1, LC2, and LC3.

Figures 22, 23:
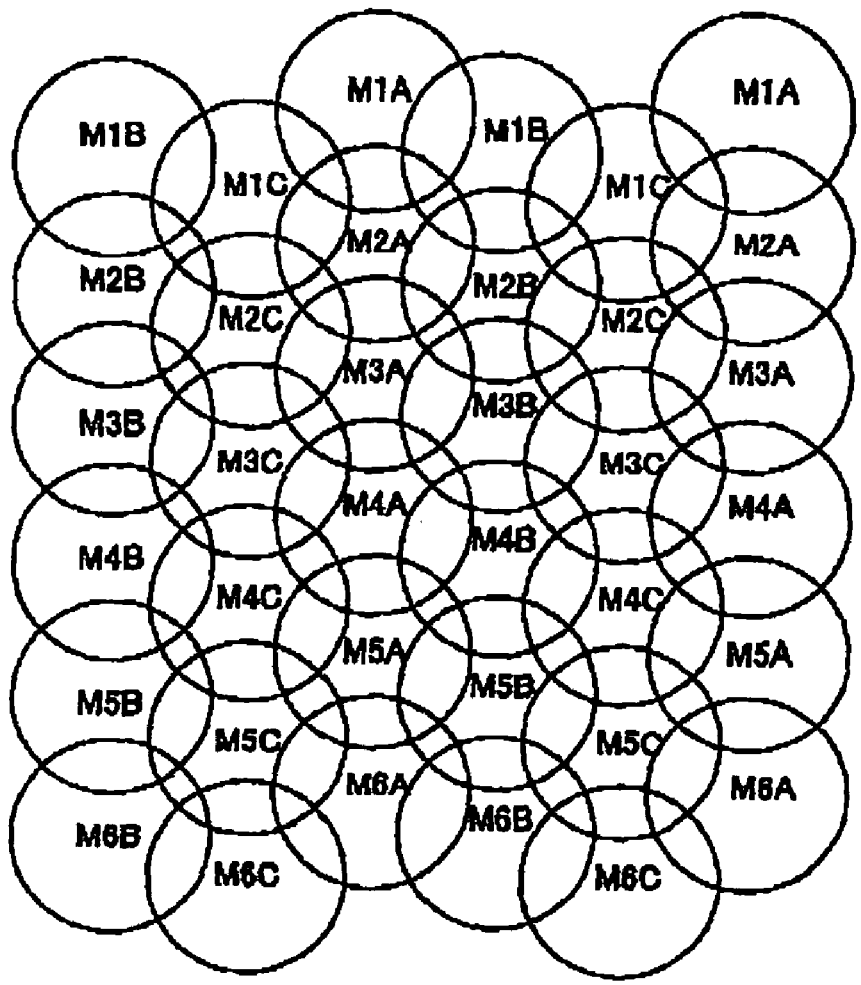
FIG. 22 is an explanatory diagram showing the layout of magenta dots formed on paper according to the multiple line process in the sixth modification.
FIG. 23 is an explanatory diagram showing a matrix used in the multiple line process in FIG. 7 for cyan according to the sixth modification.

Division is performed for a magenta image by applying masks MM1, MM2, and MM3 shown in FIG. 21 to line data LM. As shown in FIG. 22, line data LM for the first line is divided to form a line of dots M1A based on the partial line data LM1, a line of dots M1B based on the partial line data LM2, and a line of dots M1C based on the partial line data LM3. In addition, line data LM for the second line is divided to form a line of dots M2A based on the partial line data LM1, a line of dots M2B based on the partial line data LM2, and a line of dots M2C based on the partial line data LM3. This process is the same for subsequent lines of the line data LM. The pitch of neighboring lines for the partial line data LM1, LM2, and LM3 is H/3.

Figure 24:
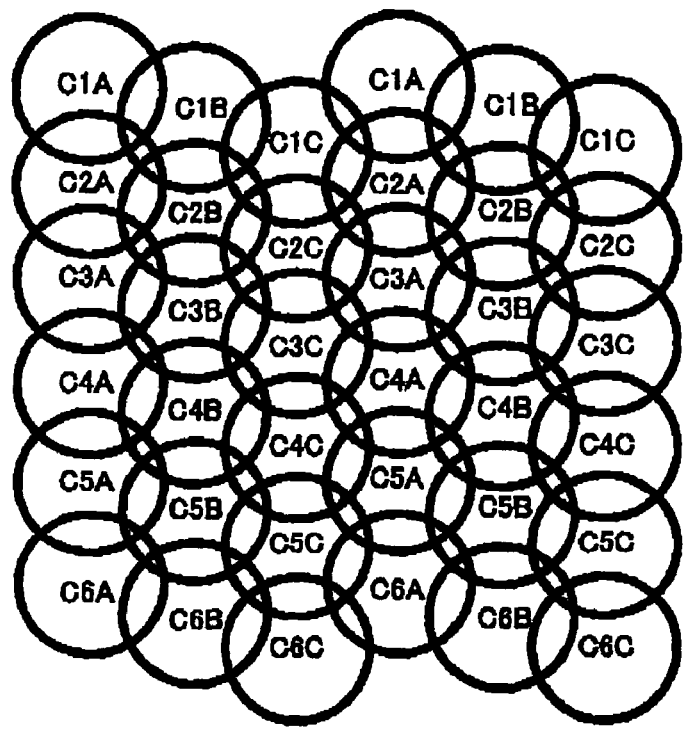
FIG. 24 is an explanatory diagram showing the layout of cyan dots formed on paper according to the multiple line process in the sixth modification.

Division is performed for a cyan image by applying masks MC1, MC2, and MC3 shown in FIG. 23 to line data LC. As shown in FIG. 24, line data LC for the first line is divided to form a line of dots C1A based on the partial line data LC1, a line of dots C1B based on the partial line data LC2, and a line of dots C1C based on the partial line data LC3. In addition, line data LC for the second line is divided to form a line of dots C2A based on the partial line data LC1, a line of dots C2B based on the partial line data LC2, and a line of dots C2C based on the partial line data LC3. This process is the same for subsequent lines of the line data LC. The pitch of neighboring lines for the partial line data LC1, LC2, and LC3 is also H/3.

Figure 25:
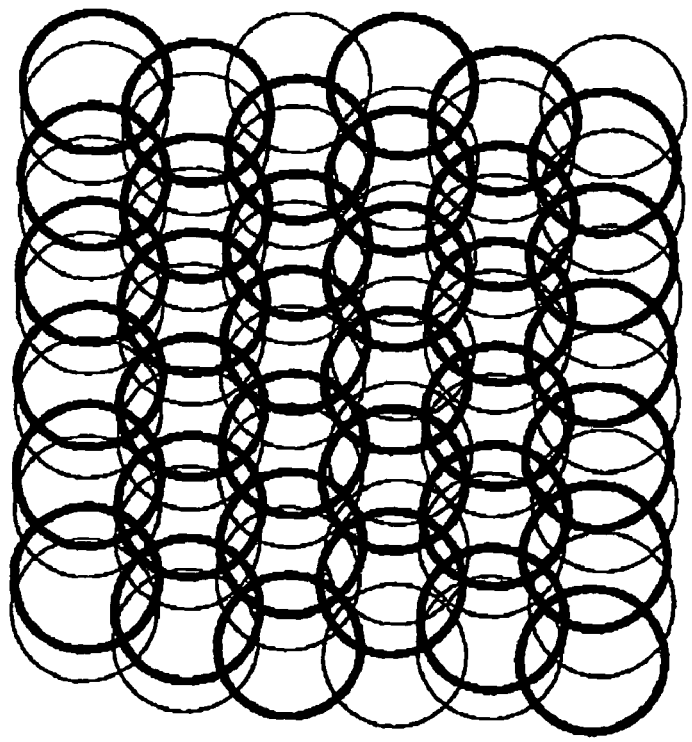
FIG. 25 is an explanatory diagram showing the layout of magenta dots and cyan dots formed on paper according to the multiple line process in the sixth modification.

In this modification, the masks MM1, MM2, and MM3 for magenta shown in FIG. 21 are different from the masks MC1, MC2, and MC3 for cyan shown in FIG. 23, respectively. Accordingly, patterns of division are different between the partial line data LM1-LM3 corresponding to magenta and the partial line data LC1-LC3 corresponding to cyan, as shown in FIG. 22 and FIG. 24. Although the dots for each color are shown separately in FIG. 22 and FIG. 24 to facilitate understanding of the present modification, these dots are actually formed as shown in FIG. 25. FIG. 25 shows that it is unlikely that there will be any area on the paper at which no dots of any color have been formed.

Since the distance between successive dots in each partial line is set to three (N=3) dots in the present modification, dots will be formed at most every three (N=3) dots when forming images while scanning in the main scanning direction. In other words, dots will be formed at an interval greater than or equal to N (N=3) dots. Accordingly, the scanning speed can be made faster than when the distance between dots is two or less, thereby shortening the time required to form images.

It is noted that line data L for yellow is divided into three sets of partial line data by using masks similar to the masks MM1, MM2, and MM3 shown in FIG. 21, by using masks similar to the masks MC1, MC2, and MC3 shown in FIG. 23, or by using any other masks.

Similarly to the fifth modification, according to the present modification, in S210, the threshold th may be set to the value of $25,400/[(N/(N-1))\times(\chi \ (\mu m/dot))]$ dpi, wherein N is equal to three. Also in S210, the main scan line resolution d is calculated as being equal to the sub-scanning direction resolution A (dpi) of 25,400/H, and is compared with the threshold "th".

<Seventh Modification>

The number N of divisions may differ according to color.

Figures 26, 27, 28:
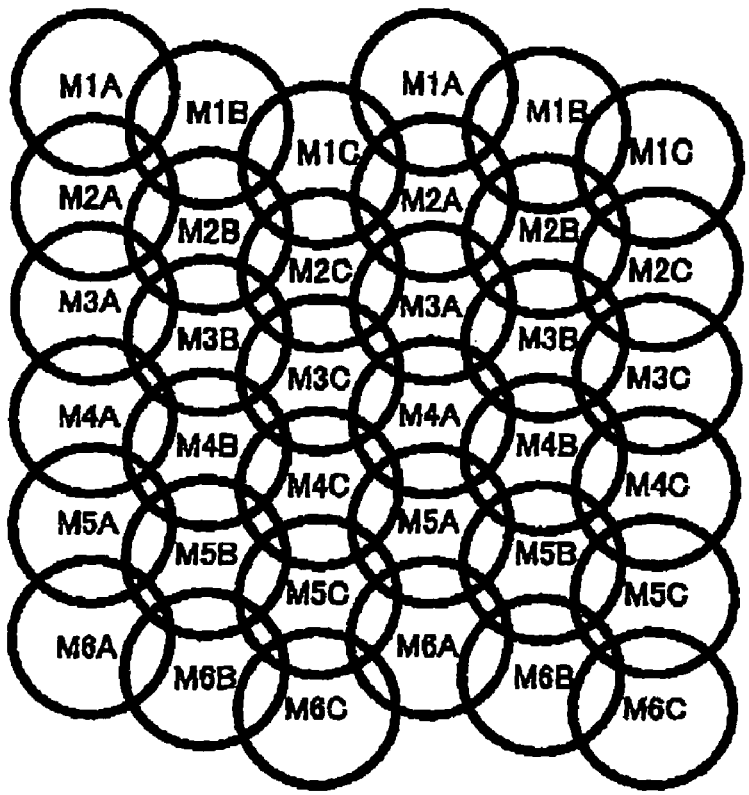
FIG. 26 is an explanatory diagram showing a matrix used in the multiple line process in FIG. 7 for magenta according to a seventh modification.
FIG. 27 is an explanatory diagram showing the layout of magenta dots formed on paper according to the multiple line process in the seventh modification.
FIG. 28 is an explanatory diagram showing a matrix used in the multiple line process in FIG. 7 for yellow according to the seventh modification.

For example, a magenta image is divided into three sets of partial line data LM1, LM2, and LM3 by applying the masks MM1, MM2, and MM3 shown in FIG. 26 to the line data LM. As shown in FIG. 27, the line data LM for the first line of the magenta image is divided to form a line of dots M1A based on the partial line data LM1, a line of dots M1B based on the partial line data LM2, and a line of dots M1C based on the partial line data LM3. The next line of line data LM is divided to form a line of dots M2A based on the partial line data LM1, a line of dots M2B based on the partial line data LM2, and a line of dots M2C based on the partial line data LM3. This process is continued for all subsequent lines of the line data LM. The pitch of adjacent lines for the partial line data LM1, LM2, and LM3 is H/3.

Figure 29:
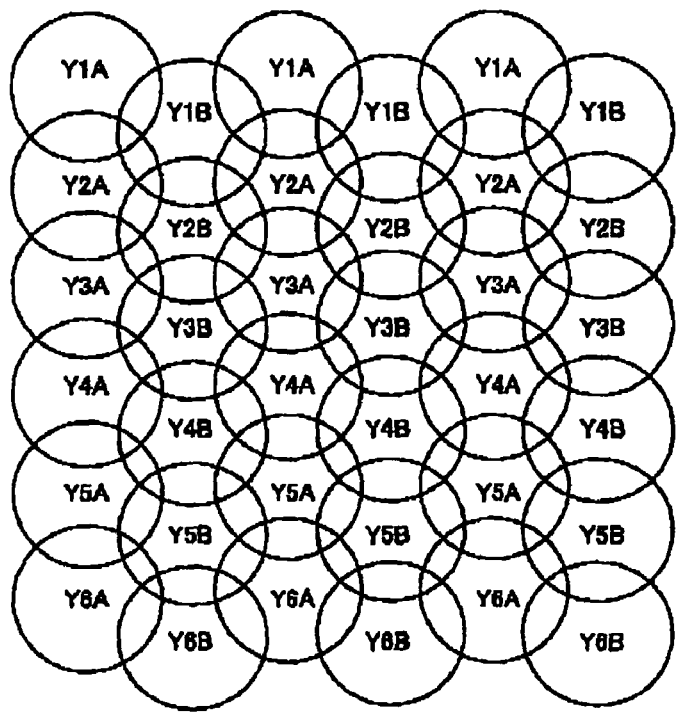
FIG. 29 is an explanatory diagram showing the layout of yellow dots formed on paper according to the multiple line process in the seventh modification.

Line data LY for a yellow image is divided into two sets of partial line data LY1 and LY2 by applying the masks MY1 ad MY2 shown in FIG. 28. As shown in FIG. 29, the first line of line data LY is divided to form a line of dots Y1A based on the partial line data LY1 and a line of dots Y1B based on the partial line data LY2. The next line of line data LY is divided to form a line of dots Y2A based on the partial line data LY1 and a line of dots Y2B based on the partial line data LY2. This process is continued for all subsequent lines of the line data LY. The pitch of adjacent lines for the partial line data LY1 and LY2 is H/2.

It is noted that line data L for cyan may be divided into three sets of partial line data by using masks similar to the masks MM1, MM2, and MM3 shown in FIG. 26. Alternatively, line data L for cyan may be divided into two sets of partial line data by using masks similar to the masks MY1 and MY2 shown in FIG. 28. It is preferable to divide line data L for cyan into three sets of partial line data similarly to line data L for magenta.

In the present modification, the line data LY is divided into two lines since yellow has lower visibility than other colors and since gaps between yellow dots are less likely to be noticeable than other colors. It is noted that from among the colors cyan, magenta, yellow, and black, yellow is the color having the lowest visibility. Magenta, on the other hand, is highly visible. Therefore, the line data LM is divided into three lines.

Since there are few partial lines for the yellow image than for the magenta image, it is possible to reduce the time required to form the yellow image. Further, since there are three partial lines for the magenta image, there is a high probability that the dots will overlap. Therefore, this configuration effectively prevents the generation of areas in which dots are not formed, even when there are deviations in the dot position or variations in the dot size.

Figure 30:
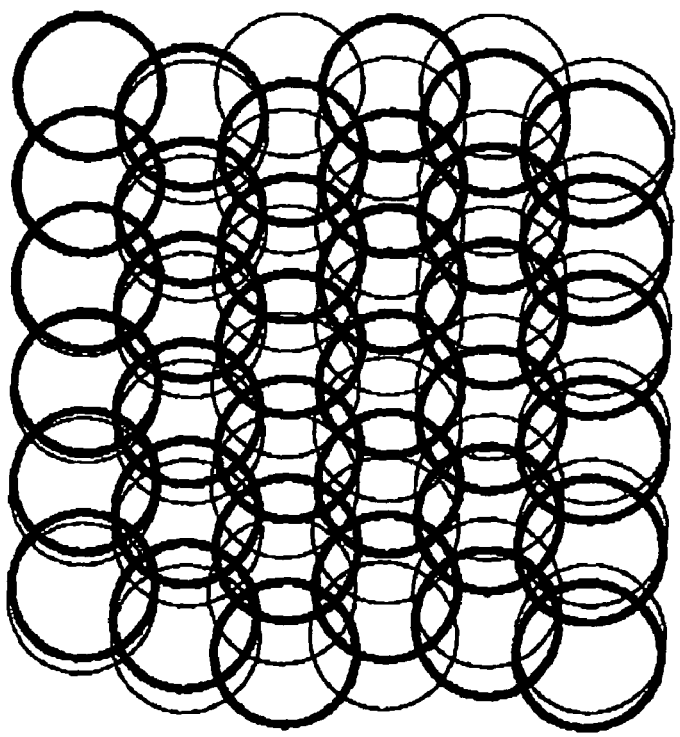
FIG. 30 is an explanatory diagram showing the layout of magenta and yellow dots formed on paper according to the multiple line process in the seventh modification.

Although the dots for each color are shown separately in FIG. 27 and FIG. 29 to facilitate understanding of the present modification, these dots are actually formed as shown in FIG. 30. Accordingly, it is unlikely that there will be any area on the paper at which no dots of any color have been formed.

Similarly to the first modification, according to the present modification, in S210, the threshold th may be set to the value of $25,400/[(N/(N-1))\times(\chi \ (\mu m))]$ dpi for each color. Because the value of N for cyan is different from that for magenta, the threshold th for cyan is different from that for magenta.

Second Embodiment

In the first embodiment, the multifunction device 1 serves as the print data generating unit. However, according to the present embodiment, a personal computer connected to the inkjet printer 4 serves as the print data generating unit.

Figure 31:
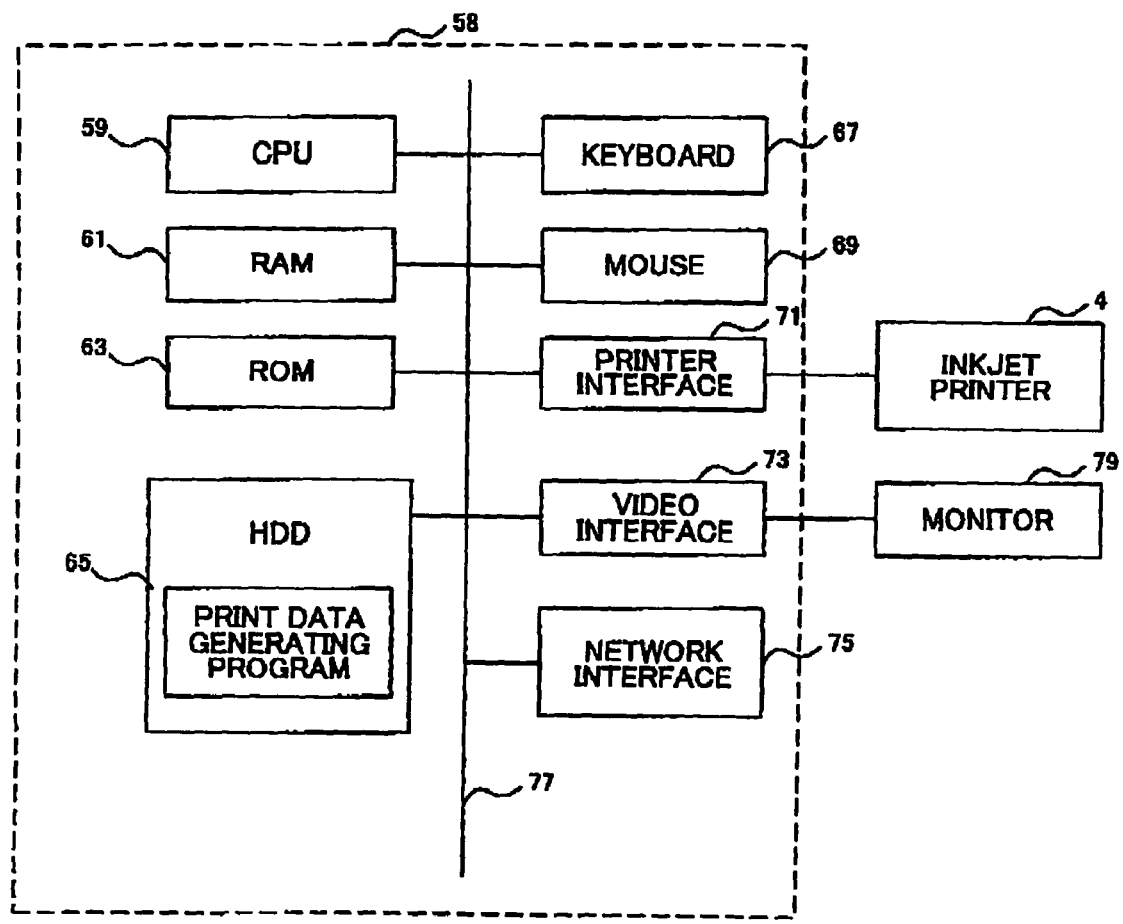
FIG. 31 is a block diagram showing the structure of a print data generating device according to a second embodiment of the present invention.

As shown in FIG. 31, a personal computer 58 includes a CPU 59, a RAM 61, a ROM 63, a hard disk drive 65, a keyboard 67, a mouse 69, a printer interface 71, a video interface 73, and a network interface 75, which components are all connected to an internal bus 77. The personal computer 58 is connected to the inkjet printer 4 via the printer interface 71 and to a monitor 79 via the video interface 73.

In the present embodiment, image data is inputted into the personal computer 58. As in the first embodiment described above, the personal computer 58 creates print data by executing the color conversion process of S110, the dot data generating process of S120, and the dot data conversion process of S130 according to the print data generating program (FIG. 6 and FIG. 7), which is now stored on the hard disk drive 65. The print data is outputted to the inkjet printer 4.

The print data generating program (FIG. 6 and FIG. 7) may be originally recorded in various types of data recording media, such as a flexible disk or a CD-ROM, and be read and loaded into the personal computer 58.

Third Embodiment

A color laser printer 201 according to a third embodiment will be described while referring to FIG. 32 and FIG. 33.

In the following description, the expressions "front", "rear", "upper", "lower", "right", and "left" are used to define the various parts when the color laser printer 201 is disposed in an orientation in which it is intended to be used.

Figure 32:
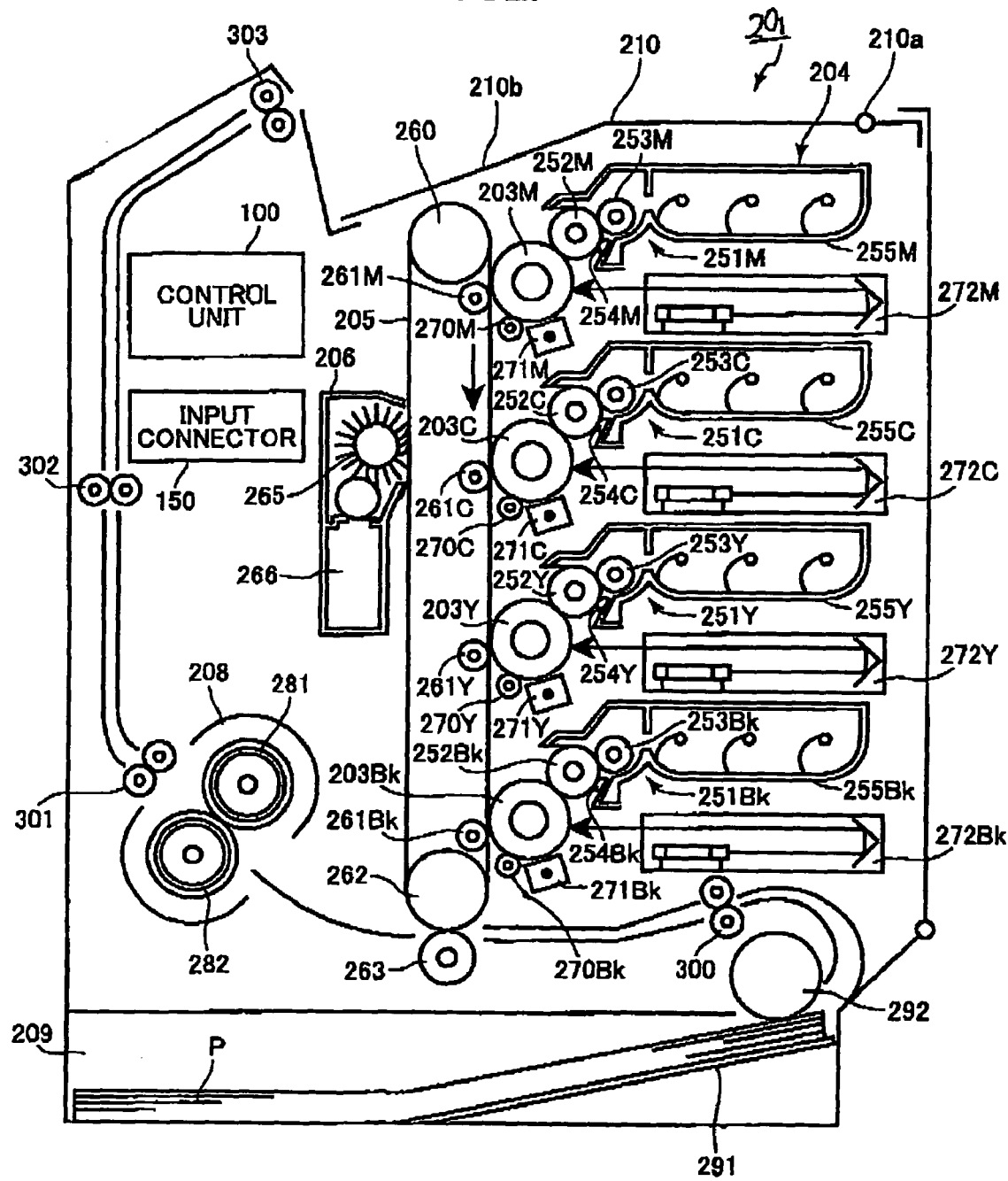
FIG. 32 is a cross-sectional view showing the general construction of a color laser printer according to a third embodiment.

FIG. 32 is a side cross-sectional view showing the general structure of the color laser printer 201. The printer 201 includes a control unit 100, a visible image forming unit 204, an intermediate transfer member 205, a fixing unit 208, a paper supply unit 209, and a paper discharge tray 210b.

For each visible image forming step using toner of the colors magenta (M), cyan (C), yellow (Y), and black (Bk), the visible image forming unit 204 includes photosensitive drums 203 (203M, 203C, 203Y, and 203Bk); chargers 271 (271M, 271C, 271Y, and 271Bk); exposure devices 272 (272M, 272C, 272Y, and 272Bk); developing units 251 (251M, 251C, 251Y, and 251Bk); and cleaning rollers 270 (270M, 270C, 270Y, and 270Bk).

Figure 33:
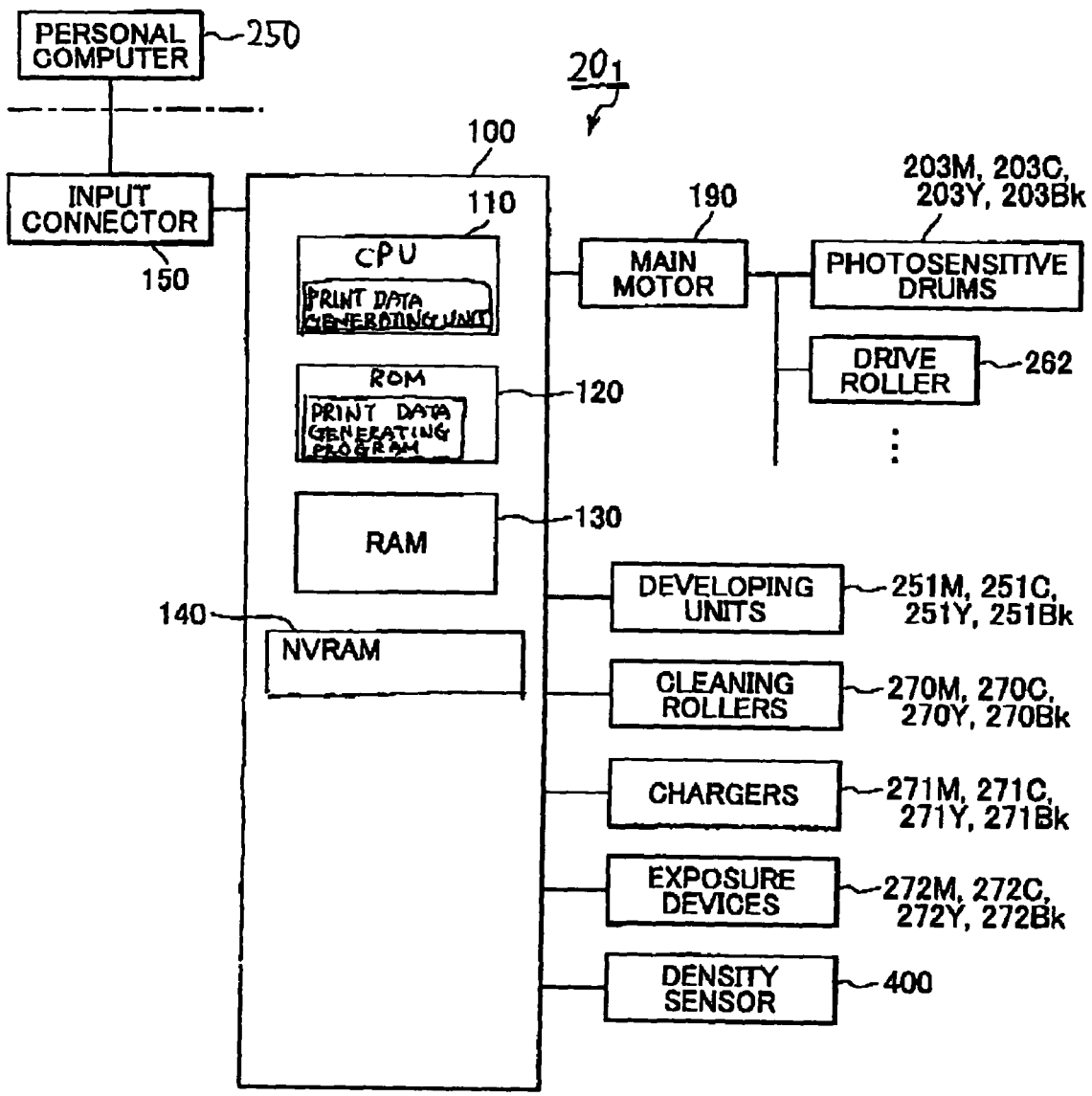
FIG. 33 is a block diagram of the color laser printer of FIG. 32.

As shown in FIG. 33, the control unit 100 controls a main motor 190 to drive rotating members, such as the photosensitive drums 203 and a drive roller 262 for driving the intermediate transfer member 205. The developing units 251 and other components are also connected to the control unit 100, which controls the power source and signal input and output to these components.

Next, these components will be described in greater detail.

The photosensitive drums 203 are configured of a cylindrical base formed of an aluminum material and a positively charged photosensitive layer formed over the surface thereof. The aluminum base serves as an electrically-grounded layer. The photosensitive drums 203 are driven by the main motor 190 to rotate in the counterclockwise direction in FIG. 32.

The chargers 271 are Scorotron type chargers. The chargers 271 are disposed in confrontation with the bottom surface of the photosensitive drums 203, but not in contact therewith, for applying a positive charge to the surface of the photosensitive drums 203.

The exposure devices 272 are configured of laser scanning units well known in the art. The exposure devices 272 are stacked vertically with the corresponding developing units 251 being located therebetweeen and are aligned horizontally with the photosensitive drums 203. The exposure devices 272 irradiate the surfaces of the photosensitive drums 203 with laser light based on exposure signals inputted from the control unit 100 at a position downstream of the chargers 271 in the rotational direction of the photosensitive drums 203. As a result, an electrostatic latent image for each color is formed on the surface of a corresponding photosensitive drum 203.

The developing units 251 are configured of developer cases 255 (255M, 255C, 255Y, and 255Bk) for accommodating toner; developing rollers 252 (252M, 252C, 252Y, and 252Bk); supply rollers 253 (253M, 253C, 253Y, and 253Bk); and thickness regulating blades 254 (254M, 254C, 254Y, and 254Bk).

The developing rollers 252 are configured of cylindrical bases formed of an electrically conductive silicone rubber or urethane rubber coated with a resin or rubber layer including fluorine.

The supply rollers 253 are electrically conductive sponge rollers, and are configured to contact the developing rollers 252 with pressure through the elastic force of the sponge material. The supply rollers 253 are configured of a foam material formed of an appropriate material, such as an electrically conductive silicone rubbers EPDM, or urethane rubber.

The base end of the thickness regulating blades 254 is formed of a stainless steel plate or the like fixed to the developer cases 255, while the free end is formed of an insulating silicone rubber or an insulating resin or rubber containing fluorine. The free end of the thickness regulating blades 254 contacts the developing rollers 252 with pressure from the bottom thereof.

The toner accommodated in the developer cases 255 is a positively charged, nonmagnetic, single-component developer. The toner includes base toner particles that are formed by adding an additive, such as coloring agent (carbon black, for example that is well known in the art) and a charge-controlling agent or charge-controlling resin such as nigrosine, triphenylmethane, or quaternary ammonium salt, to a styrene-acrylic resin formed in a spherical shape through suspension polymerization. Toner of the colors magenta, cyan, yellow, and black are accommodated in the respective developer cases 255M, 255C, 255Y, 255Bk.

The toner is positively charged when supplied from the supply rollers 253 to the developing rollers 252, and is formed in a thin layer of uniform thickness on the developing rollers 252 by the thickness regulating blades 254. At the contact point between the developing rollers 252 and photosensitive drums 203, the developing units 251 develop electrostatic latent images, having a positive polarity and formed on the photosensitive drums 203, with a positively charged toner by the reverse developing method.

The cleaning rollers 270 are configured of rollers formed of electrically conductive sponges or other elastic materials and are disposed upstream of the chargers 271 in the rotational direction of the photosensitive drums 203 so as to slide against the surface of the photosensitive drums 203. A power source (not shown) applies the cleaning rollers 270 with a voltage with a negative polarity that is opposite to the polarity of the toner. The effect of the frictional force on the photosensitive drums 203 and the electric field generated by the voltage removes toner from the photosensitive drums 203. The color laser printer 201 employs a cleanerless developing system. Accordingly, during a prescribed cycle after a developing step is completed, the cleaning rollers 270 are charged with a reverse polarity so as to return toner temporarily removed from the photosensitive drums 203 back to the photosensitive drums 203. This toner is then collected by the developing rollers 252 and returned to the developing units 251 of the respective color.

The intermediate transfer member 205 has a belt shape formed from a conductive sheet of polycarbonate, polyimide, or the like. As shown in FIG. 32, the intermediate transfer member 205 is looped around two drive rollers 260 and 262. Intermediate transfer rollers 261 (261M, 261C, 261Y, and 261Bk) are disposed near positions opposing the respective photosensitive drums 203. The intermediate transfer member 205 circulates in a loop elongated vertically, as shown in FIG.

32, such that the surface side of the intermediate transfer member 205 opposing the photosensitive drums 203 moves vertically downward.

A prescribed voltage is applied to the intermediate transfer rollers 261 for transferring a toner image formed on the photosensitive drums 203 to the intermediate transfer member 205.

A secondary transfer roller 263 is disposed at a position in which the toner image is transferred to a paper P. In other words, the secondary transfer roller 263 opposes the intermediate transfer member 205 at the drive roller 262 positioned on the bottom end of the intermediate transfer member 205. A prescribed potential is applied to the secondary transfer roller 263. As a result, a full-color toner image carried on the surface of the intermediate transfer member 205 is transferred onto the paper P passing between the drive roller 262 and secondary transfer roller 263.

As shown in FIG. 32, a cleaning device 206 is disposed on the side of the intermediate transfer member 205 opposite the side that opposes the photosensitive drums 203. The cleaning device 206 includes a scraping member 265, and a case 266. Any toner remaining on the surface of the intermediate transfer member 205 is scraped off by the scraping member 265 and collected in the case 266.

The paper supply unit 209 is disposed in the bottommost section of the printer 201 and includes a tray 291 for accommodating the paper P, and a pickup roller 292 for feeding the paper P. The pickup roller 292 is driven to feed the paper P at a prescribed timing in an imaging forming step performed by the exposure devices 272, developing units 251, photosensitive drums 203, and intermediate transfer member 205. The paper P supplied from the paper supply unit 209 is conveyed by a pair of conveying rollers 300 to a pressure contact point between the intermediate transfer member 205 and the secondary transfer roller 263.

The fixing unit 208 is configured of a first heating roller 281 and a second heating roller 282. After a full-color toner image is transferred onto the paper P, the paper P is interposed between and conveyed by the heating rollers 281 and 282. The heating rollers 281 and 282 apply heat and pressure to the paper P to fix the toner image thereon.

An upper cover 210 is disposed on the topmost portion of the printer 201. The upper cover 210 is capable of rotating about a shaft 210a. Part of the upper cover 210 serves as the paper discharge tray 210b. The paper discharge tray 210b is disposed on the discharge side of the fixing unit 208 and is configured to accommodate paper P discharged from the fixing unit 208 and conveyed out of the printer 201 by pairs of conveying rollers 301, 302, and 303.

An input connector 150 is provided on the side surface of the printer 201. As shown in FIG. 33, the input connector 150 is connected to the control unit 100 and is also connected to a personal computer 250. In this example, the personal computer 250 inputs image data (CMYK image data or RGB image data) to the printer 201 via the input connector 150. Hence, the input connector 150 serves to transfer signals, including image data, between the control unit 100 and the personal computer 250.

As shown in FIG. 33, the control unit 100 is configured of a microcomputer well known in the art that includes a CPU 110, a ROM 120, a RAM 130, and a nonvolatile RAM (NVRAM) 140. The control unit 100 performs various processes for components connected thereto according to programs stored in the ROM 120. The programs include a print data generating program according to the present embodiment. By executing the print data generating program, the CPU 110 serves as a print data generating unit. The print data generating program according to the present embodiment is the same as that of FIGS. 6-7 except for the points described below.

According to the present embodiment, in S220, after dividing the line data L for each color into partial line data L1-LN for a corresponding color, the CPU 110 generates exposure signals for each color by subjecting the partial line data L1-LN of the corresponding color to a predetermined converting process. In S230, the CPU 110 outputs the exposure signals for each color to the corresponding exposure device 272.

Similarly, according to the present embodiment, in S240, after dividing the line data L for each color into segments Q1-QN for the corresponding color, the CPU 110 generates exposure signals for each color by subjecting the segments Q1-QN for the corresponding color to a predetermined converting process. In S250, the CPU 110 outputs the exposure signals for each color to the corresponding exposure device 272.

Thus, according to the present embodiment, when the CPU 110 receives image data for each color from the personal computer 250, the CPU 110 functions as the print data generating unit by executing the print data generating program of the present embodiment to create print data for the subject color and then further create exposure signals for the subject color. The exposure signals for each color are transmitted to the corresponding exposure device 272, which in turn forms an electrostatic latent image of a corresponding color.

Next will be described how the printer 201 prints images.

First, the chargers 271 apply a uniform charge to the photosensitive surfaces of the photosensitive drums 203.

The control unit 100 generates print data and exposure signals by executing the print data generating program of the present embodiment, and outputs the exposure signals to the exposure devices 272.

The corresponding photosensitive drums 203 are exposed by the exposure devices 272 according to the exposure signals for the respective colors magenta, cyan, yellow, and black, forming electrostatic latent images on the photosensitive drums 203.

The developing units 251 deposit magenta toner, cyan toner, yellow toner, and black toner on the photosensitive drums 203 to develop the latent images formed on the photosensitive layer of the photosensitive drums 203 in the respective magenta, cyan, yellow, and black colors. Subsequently, the toner images formed in magenta, cyan, yellow, and black are transferred temporarily to the surface of the intermediate transfer member 205 by the intermediate transfer rollers 261.

During this process, the toner images in each color are formed at slightly staggered or shifted time intervals to account for the speed of the intermediate transfer member 205 and the positions of the photosensitive drums 203, so as to superimpose the toner images of all the four colors on the intermediate transfer member 205.

Toner remaining on the photosensitive drums 203 after this transfer process is collected and temporarily held by the cleaning rollers 270.

The full-color toner image formed on the intermediate transfer member 205 is subsequently transferred onto the paper P supplied from the paper supply unit 209 at the position of contact between the secondary transfer roller 263 and the intermediate transfer member 205. The paper P is then conveyed to the fixing unit 208, where the toner image is fixed thereon, and subsequently discharged onto the paper discharge tray 210b by the conveying rollers 301, 302, and 303, thereby completing the formation of a full-color image.

Because the print data is generated in the same manner as in the first embodiment and exposure signals are generated based on the print data, the color laser printer 201 attains the same advantages as the ink jet printer 4 of the first embodiment.

It is noted that all the modifications of the first embodiment may be applied to the present embodiment.

Especially, it is preferable to apply the sixth modification (FIGS. 21-25) to the present embodiment. In this case, patterns of division are different between the partial line data LM1-LM3 corresponding to magenta and the partial line data LC1-LC3 corresponding to cyan as shown in FIG. 22 and FIG. 24. In the color laser printer 201, if toner of a plurality of colors thickly overlapped at the same positions, the toner will fail to be fixed firmly onto a sheet of paper. However, by applying the sixth modification to the color laser printer 201, it is possible to prevent toner of cyan and magenta colors from thickly overlapping at the same positions.

It is noted that the color laser printer 201 has the four exposure devices 272 in one to one correspondence with the four colors. The control unit 100 controls the exposure devices 272 independently from one another to form electrostatic latent images for respective colors independently from one another. The control unit 100 can therefore easily control the exposure devices 272 independently from one another according to different division numbers N when the seventh modification of the first embodiment (FIG. 26-30) is applied to the color laser printer 201.

<Modification>

Figure 34:
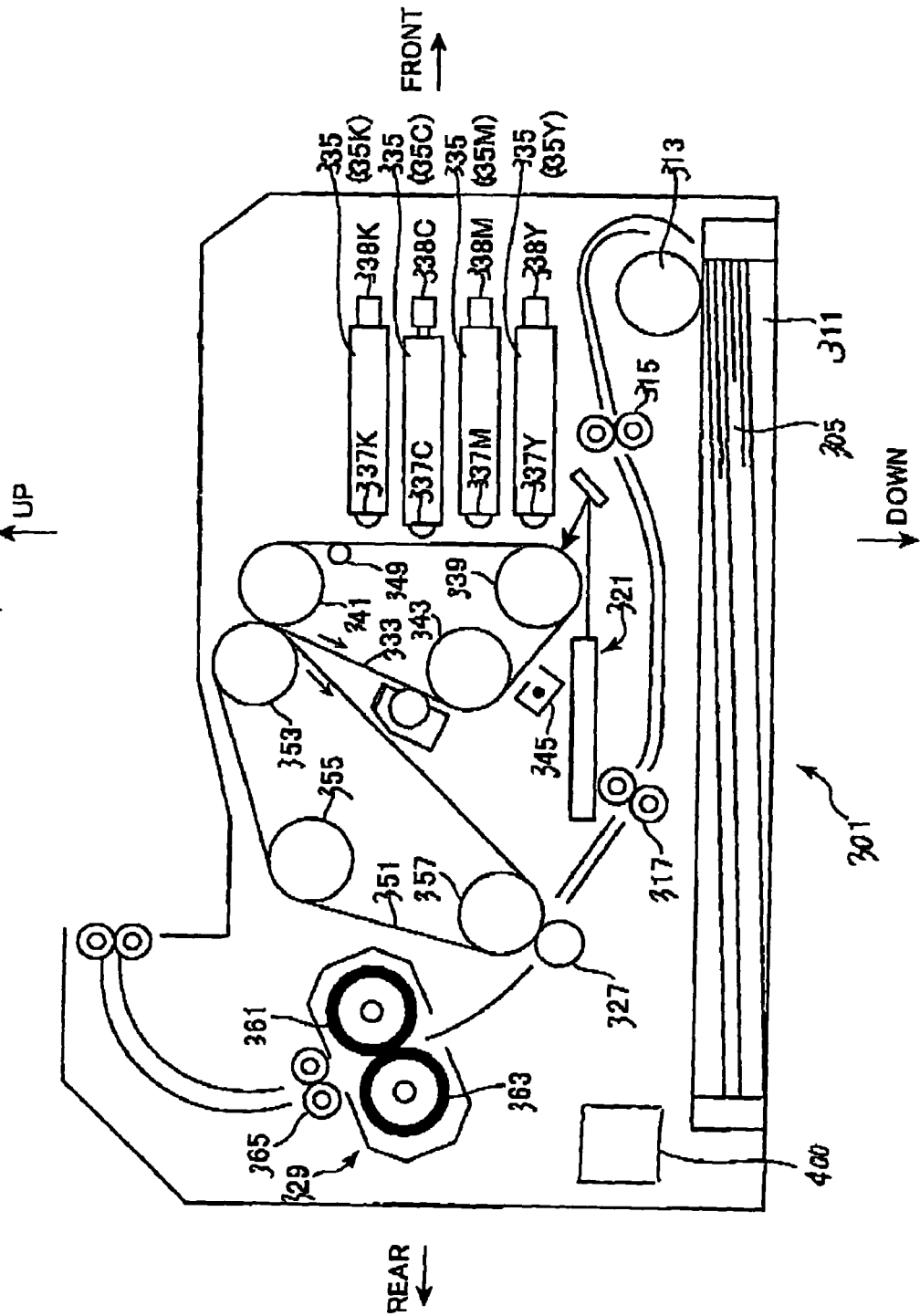
FIG. 34 is a cross-sectional view showing the general structure of a four-cycle color laser printer according to a modification of the third embodiment.

The color laser printer 201 of the above-described third embodiment is of a tandem type. However, the color laser printer 201 may be modified into a color laser printer 301 of a four cycle type as shown in FIG. 34.

In the color laser printer 301, a supply roller 313 applies pressure to the top sheet of paper 305 stored in a paper tray 311 such that rotation of the supply roller 313 delivers the paper 305 one sheet at a time into a paper transportation path. The paper 305 is then conveyed by transportation rollers 315 and registration rollers 317.

An organic photoconductor (OPC) belt 333 is wound around first to third OPC belt rollers 339, 341, and 343. The surface of the organic photoconductor (OPC) belt 333 is uniformly charged by an OPC belt charger 345, before the OPC belt 333 is exposed by high speed scanning of a laser beam from a scanner unit 321 based on exposure signals for yellow toner. As a result, an electrostatic latent image having positively charged parts and uncharged parts is formed on the surface of the OPC belt 333 according to the exposure signals. A first OPC belt roller 339 and the third OPC belt roller 343 supply electric current to a base layer (not shown) of the OPC belt 333 in contact therewith, and thus hold the potential of the contact area to ground. It is noted that a potential gradient controller 349 lowers the potential of the base layer to ground at the point of contact.

A yellow separation solenoid 338Y then moves a yellow developer cartridge 335Y horizontally to the rear towards the OPC belt 333 on which the electrostatic latent image is formed so that a developer roller 337Y contacts the OPC belt 333 on which the electrostatic latent image is formed. At this time, a magenta developer cartridge 335M, a cyan developer cartridge 335C, and a black developer cartridge 335K are each moved horizontally towards the front, that is, away from the OPC belt 333, by respective separation solenoids 338M, 338C, 338K, and are thus separated from the OPC belt 333.

Yellow toner is stored in the yellow developer cartridge 335Y. The yellow toner is positively charged, and thus adheres only to the uncharged areas of the OPC belt 333. A visible yellow image is thus formed on the OPC belt 333.

The visible yellow image formed on the OPC belt 333 is then transferred to the surface of an intermediate transfer belt 351 as the OPC belt 333 moves and contacts the intermediate transfer belt 351. The intermediate transfer belt 51 is wound around first to third intermediate transfer belt (ITB) rollers 353, 355, and 357.

It is noted that a forward bias (+300 V potential) is applied to the second OPC belt roller 341 at this time, thereby charging the photosensitive layer of the belt 333 near the second OPC belt roller 341 to a +300 V potential through the intervening conductive base layer. This produces a repulsive force between the positively charged yellow toner and the photosensitive layer of the belt 333, and facilitates transferring the toner to the intermediate transfer belt 351.

Next, an electrostatic latent image for magenta is formed on the OPC belt 333, a visible magenta toner image is then formed, and the visible magenta toner image is transferred to the intermediate transfer belt 351 in the same manner as described above for yellow.

More specifically, an electrostatic latent image for the magenta color component is formed on the OPC belt 333 by the scanner unit 321 based on exposure signals for magenta, and the magenta developer cartridge 335M is moved horizontally by the magenta separation solenoid 338M to the back so that the developer roller 337M contacts the OPC belt 333. At the same time, the yellow developer cartridge 335Y, cyan developer cartridge 335C, and black developer cartridge 335K are moved horizontally to the front by the respective separation solenoids 338Y, 338C, 338K and thus separated from the OPC belt 333. As a result, a visible magenta toner image is formed on the OPC belt 333 by the magenta toner stored in the magenta developer cartridge 335M. In the same manner as described above for the yellow image, when the OPC belt 333 moves so that the magenta image becomes opposing the intermediate transfer belt 351, the magenta toner image is transferred to the intermediate transfer belt 351 over the previously transferred yellow toner image.

The same operation is then repeated for the cyan toner stored in the cyan developer cartridge 335C and the black toner stored in the black developer cartridge 335K, thereby forming a full-color image on the intermediate transfer belt 351.

A transfer roller 327 is then set from a standby position, where the transfer roller 327 is separate from the intermediate transfer belt 351, to a transfer position, where the transfer roller 27 contacts the intermediate transfer belt 51. The full-color image formed on the intermediate transfer belt 351 is transferred at one time to the paper 5 by the transfer roller 327 as the paper 305 passes between the intermediate transfer belt 351 and the transfer roller 327.

The heat roller 361 then thermally fixes the full-color image, which is now transferred on the paper 305, as the paper 305 passes between a heat roller 361 and a pressure roller 363. The transportation rollers 365 then convey the paper 305, on which the full-color image has been thermally fixed by the fixing unit 329, to a pair of discharge rollers. The discharge rollers then discharge the paper 305 conveyed thereto onto a discharge tray formed on the top of the printer 301. The color laser printer 301 thus prints a full-color image onto the paper 305.

A control unit 400 controls the entire portion of the color laser printer 301. The control unit 400 functions in the same manner as the control unit 100 in the third embodiment to create print data for each color and then to create exposure signals for each color. The exposure signals for each color are transmitted to the scanner unit 321, which in turn forms an electrostatic latent image of a corresponding color. Accordingly, the color laser printer 301 attains the same advantages as the color laser printer 201 of the third embodiment.

It is noted that all the modifications of the first embodiment may be applied to the present modification.

Especially, it is preferable to apply the sixth modification (FIGS. 21-25) to the color laser printer 301. In this case, patterns of division are different between the partial line data LM1-LM3 corresponding to magenta and the partial line data LC1-LC3 corresponding to cyan as shown in FIG. 22 and FIG. 24. In the color laser printer 301, if toner of a plurality of colors thickly overlapped at the same positions, the toner will fail to be fixed firmly onto a sheet of paper. However, by applying the sixth modification to the color laser printer 301, it is possible to prevent toner of cyan and magenta colors from thickly overlapping at the same positions.

It is noted that the color laser printer 301 controls the single scanner unit 321 based on exposure signals for the four colors at different timings from one another. In other words, the control unit 400 controls the scanner unit 321 to form electrostatic latent images of respective colors independently from one another. The control unit 400 can therefore easily control the scanner unit 321 according to different division numbers N when the seventh modification of the first embodiment (FIG. 26-30) is applied to the color laser printer 301.

While the invention has been described in detail with reference to the specific embodiments thereof, it would be apparent to those skilled in the art that various changes and modifications may be made therein without departing from the spirit of the invention.

In the first embodiment, the partial lines L1 and L2 may be formed by repeatedly using masks M1=(1, 1, 0, 0) and M2=(0, 0, 1, 1) instead of repeatedly using the marks M1=(1, 0) and M2=(0, 1). In this case, the distance between successive dots in each set of partial line data L1 or L2 is one dot or three dots. More specifically, dots are formed in each line L1 or L2 in successive groups, which are arranged at four dots' worth of interval in the main scanning direction. Each group has four dot locations, which are arranged at one dot's worth of interval in the main scanning direction. Two dots are formed at most in succession in each group. This modification can also reduce the chance of gaps appearing between dots and reducing the likelihood of noticeable unevenness in the periphery of image formation regions.

The ink jet printer 4 can be modified to execute a monochromatic printing rather than the multicolor printing.

All the N number of partial line data L1-LN may not be printed at different locations from one another in the sub-scanning direction. At least one partial line data Li (i is greater than or equal to 1 and smaller than or equal to N) may be formed at a different location from other partial line data in the sub-scanning direction.

What is claimed is:

1. An image-forming method for forming images on a recording medium based on image data by arranging image elements in lines along a main scanning direction to form main scan lines, comprising:
   receiving image data including one set of main scan line data, the one set of main scan line data being one line worth of data indicative of a single main scan line image extending in the main scanning direction;
   determining whether or not to execute a division process on the one set of main scan line data;
   dividing, when it is determined to execute the division process, the one set of main scan line data into N number of sets of partial line data, where N is an integer greater than or equal to 2, the N number of sets of partial line data indicating N number of partial line images, each of which extends in the main scanning direction, at least one of the N number of partial line images being shifted from another remaining partial line image in a sub-scanning direction that is substantially orthogonal to the main scanning direction; and
   forming, with an image-forming device, the single main scan line image based on the one set of main scan line data when it is determined not to execute the division process, and forming, with the image-forming device, the N number of partial line images based on the N number of sets of partial line data when the one set of main scan line data is divided into the N number of sets of partial line data.

2. An image-forming method according to claim 1, wherein partial line images are formed on the recording medium with each subsequent partial line image being offset in the sub-scanning direction by H/N, where H is a line pitch in the sub-scanning direction when an image is formed without dividing the main scan line data.

3. An image-forming method according to claim 1, wherein N is equal to 2.

4. An image-forming method according to claim 1, wherein the determining determines whether or not to execute the division process based on a value of a main scan line resolution in the image data.

5. An image-forming method according to claim 4, wherein the determining determines to perform the dividing process when a product of the main scan line resolution of the image data and N is greater than or equal to a predetermined visual resolution.

6. An image-forming method according to claim 4, wherein the determining determines to perform the dividing process when the main scan line resolution is greater than or equal to a predetermined visual resolution.

7. An image-forming method according to claim 6, wherein the visual resolution is substantially equal to a value B (dpi) that satisfies a relationship B=177,800/C, wherein C is a distance (mm) between the recording medium, on which an image is formed, and a position from which the image on the recording medium will be observed.

8. An image-forming method according to claim 6, wherein the visual resolution is equal to 508 dpi.

9. An image-forming method according to claim 4, further comprising:
   separating one set of main scan line data into a plurality of groups when the determining-step determines not to execute the dividing process; and
   wherein the single main scan line image is formed on the recording medium by successively forming a plurality of sections of the main scan line based on the plurality of groups.

10. An image-forming method according to claim 1, wherein an inkjet print head is controlled to form the partial line images based on the partial line data.

11. An image-forming method according to claim 1, wherein a laser printing device is controlled to form the partial line images based on the partial line data.

12. An image-forming method according to claim 1, wherein the image data is received for each of a plurality of colors; and
   the dividing process divides the main scan line data for each color according to a corresponding pattern, the pattern for at least one color being different from the pattern for other remaining color, and the partial line images being formed using partial line data for each of the plurality of colors.

13. An image-forming method according to claim 1, wherein the image data is received for each of a plurality of colors; and
the dividing process divides the main scan line data for each color by setting the value N to a corresponding value, the value N for at least one color being different from the value N for other remaining color, and
the partial line images are formed using partial line data for each of the plurality of colors.

14. An image-forming method according to claim 13, wherein the value of N for a color having lower visibility than other colors among the plurality of colors is less than the values of N for the other colors.

15. An image-forming method according to claim 1, wherein each set of partial line data indicates that image elements are arranged in the main scanning direction at an interval greater than or equal to an N dot's worth of distance.

16. An image-forming device for forming images on a recording medium based on image data by arranging image elements in lines along a main scanning direction to form main scan lines, comprising:
a receiving unit that receives image data including one set of main scan line data, the one set of main scan line data being one line worth of data indicative of a single main scan line image extending in the main scanning direction;
a determining unit that determines whether or not to execute a dividing operation on the one set of main scan line data;
a dividing unit that, when the determining unit determines to execute the dividing operation, divides the one set of main scan line data into N number of sets of partial line data, where N is an integer greater than or equal to and 2, the N number of sets of partial line data indicating N number of partial line images, each of which extends in the main scanning direction, at least one of the N number of partial line images being shifted from another remaining partial line image in a sub-scanning direction that is substantially orthogonal to the main scanning direction; and
an image forming unit that forms the single main scan line image based on the one set of main scan line data when the determining unit determines not to execute the dividing operation, and that forms the N number of partial line images based on the N number of sets of partial line data when the dividing unit divides the one set of main scan line data into the N number of sets of partial line data.

17. An image-forming device according to claim 16, wherein the image forming unit forms the partial line images on the recording medium with each subsequent partial line image being offset in the sub-scanning direction by H/N, where H is a line pitch in the sub-scanning direction when an image is formed without dividing the main scan line data.

18. An image-forming device according to claim 16, wherein N is equal to 2.

19. An image-forming device according to claim 16, wherein the determining unit determines whether or not to control the dividing unit to perform the dividing operation based on a value of a main scan line resolution in the image data.

20. An image-forming device according to claim 19, wherein the determining unit determines to control the dividing unit to perform the dividing operation when a product of the main scan line resolution of the image data and N is greater than or equal to a predetermined visual resolution.

21. An image-forming device according to claim 19, wherein the determining unit determines to control the dividing unit to perform the dividing operation when the main scan line resolution is greater than or equal to a predetermined visual resolution.

22. An image-forming device according to claim 21, wherein the visual resolution is substantially equal to a value B (dpi) that satisfies a relationship B=177,800/C, wherein C is a distance (mm) between the recording medium, on which an image is formed, and a position from which the image on the recording medium will be observed.

23. An image-forming device according to claim 21, wherein the visual resolution is equal to 508 dpi.

24. An image-forming device according to claim 19, further comprising a separating unit that separates the one set of main scan line data into a plurality of groups when the determining unit determines not to execute the dividing operation,
the image forming unit forming a single main scan line on the recording medium by successively forming a plurality of sections of the main scan line based on the plurality of groups.

25. An image-forming device according to claim 16, wherein the image forming unit controls an inkjet print head to form the partial line images based on the partial line data.

26. An image-forming device according to claim 16, wherein the image forming unit controls a laser printing device to form the partial line images based on the partial line data.

27. An image-forming device according to claim 16, wherein the receiving unit receives the image data for each of a plurality of colors; and
the dividing unit divides the main scan line data for each color according to a corresponding pattern, the pattern for at least one color being different from the pattern for other remaining color, and
the image forming unit forming the partial line images using partial line data for each of the plurality of colors.

28. An image-forming device according to claim 16, wherein the receiving unit receives the image data for each of a plurality of colors; and
the dividing unit divides the main scan line data for each color by setting the value N to a corresponding value, the value N for at least one color being different from the value N for other remaining color, and
the image forming unit forming the partial line images using partial line data for each of the plurality of colors.

29. An image-forming device according to claim 28, wherein the value of N for a color having lower visibility than other colors among the plurality of colors is less than the values of N for the other colors.

30. An image-forming device according to claim 16, wherein each set of partial line data indicates that image elements are arranged in the main scanning direction at an interval greater than or equal to an N dot's worth of distance.

31. An image data converting method, comprising:
receiving image data including one set of main scan line data, the one set of main scan line data being one line worth of data indicative of one main scan line image extending in a main scanning direction;
determining whether or not to execute a division process on the one set of main scan line data;
dividing, with an image processing device, the one set of main scan line data into N number of sets of partial line data when it is determined to execute the division process, where N is an integer greater than or equal to 2, the N number of sets of partial line data indicating to form N number of partial line images, each of which extends in the main scanning direction, at least one of the N number of partial line images being shifted from another remaining partial line image in a sub-scanning direction that is substantially orthogonal to the main scanning direction; and outputting the one set of main scan line data when it is determined not to execute the division process and outputting the N number of sets of partial line data when the one set of main scan line data is divided into the N number of sets of partial line data.

32. An image data converting device, comprising:

a receiving unit that receives image data including one set of main scan line data, the one set of main scan line data being one line worth of data indicative of one main scan line image extending in a main scanning direction;

a determining unit that determines whether or not to execute a dividing operation on the one set of main scan line data;

a dividing unit that, when the determining unit determines to execute the dividing operation, divides the one set of main scan line data into N number of sets of partial line data, where N is an integer greater than or equal to 2, the N number of sets of partial line data indicating to form N number of partial line images, each of which extends in the main scanning direction, at least one of the N number of partial line images being shifted from another remaining partial line image in a sub-scanning direction that is substantially orthogonal to the main scanning direction; and an outputting unit that outputs the one set of main scan line data when the determining unit determines not to execute the dividing operation and that outputs the N number of sets of partial line data when the dividing unit divides the one set of main scan line data into the N number of sets of partial line data.

33. A program recording medium storing a program readable by a computer, the program including:

a program of receiving image data including one set of main scan line data, the one set of main scan line data being one line worth of data indicative of one main scan line image extending in a main scanning direction;

a program of determining whether or not to execute a division process on the one set of main scan line data;

a program of dividing the one set of main scan line data into N number of sets of partial line data when it is determined to execute the division process, where N is an integer greater than or equal to 2, the N number of sets of partial line data indicating to form N number of partial line images, each of which extends in the main scanning direction, at least one of the N number of partial line images being shifted from another remaining partial line image in a sub-scanning direction that is substantially orthogonal to the main scanning direction; and a program of outputting the one set of main scan line data when it is determined not to execute the division process and outputting the N number of sets of partial line data when the one set of main scan line data is divided into the N number of sets of partial line data.

* * * * *